United States Patent
Yasuda et al.

(10) Patent No.: US 11,374,742 B2
(45) Date of Patent: Jun. 28, 2022

(54) CONVERSION KEY GENERATION DEVICE, CIPHERTEXT CONVERSION DEVICE, PRIVACY-PRESERVING INFORMATION PROCESSING SYSTEM, CONVERSION KEY GENERATION METHOD, CIPHERTEXT CONVERSION METHOD, AND COMPUTER

(71) Applicant: Mitsubishi Electric Corporation, Tokyo (JP)

(72) Inventors: Satoshi Yasuda, Tokyo (JP); Yoshihiro Koseki, Tokyo (JP); Yutaka Kawai, Tokyo (JP); Ryo Hiromasa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 115 days.

(21) Appl. No.: 16/761,731

(22) PCT Filed: Dec. 28, 2017

(86) PCT No.: PCT/JP2017/047148
§ 371 (c)(1),
(2) Date: May 5, 2020

(87) PCT Pub. No.: WO2019/130528
PCT Pub. Date: Jul. 4, 2019

(65) Prior Publication Data
US 2020/0344049 A1    Oct. 29, 2020

(51) Int. Cl.
*H04L 9/00* (2022.01)
*H04L 9/08* (2006.01)
(Continued)

(52) U.S. Cl.
CPC .......... *H04L 9/0825* (2013.01); *H04L 9/008* (2013.01); *H04L 9/0861* (2013.01); *H04L 9/14* (2013.01)

(58) Field of Classification Search
CPC ..... H04L 9/0825; H04L 9/008; H04L 9/0861; H04L 9/14
See application file for complete search history.

(56) References Cited

U.S. PATENT DOCUMENTS

2014/0115321 A1    4/2014  Isshiki
2015/0016606 A1*   1/2015  Omino ................. H04L 9/0869
                                                    380/46
(Continued)

FOREIGN PATENT DOCUMENTS

JP    2012-195733 A    10/2012
JP    2015-19333 A     1/2015
(Continued)

OTHER PUBLICATIONS

"Lopez-Alt et al.", "On-the-Fly Multiparty Computation on the Cloud via Multikey Fully Homomorphic Encryption", 2012 (Year: 2012).*

(Continued)

*Primary Examiner* — Darshan I Dhruv
(74) *Attorney, Agent, or Firm* — Birch, Stewart, Kolasch & Birch, LLP

(57) ABSTRACT

A key acquisition unit (411) acquires a decryption key $sk_i$ in a pair of a conversion source and a public key $pk_j$ in a pair of a conversion target, out of a plurality of pairs of a decryption key and a public key. A conversion key generation unit (412) encrypts the decryption key $sk_i$ acquired by the key acquisition unit (411) with the public key $pk_j$, so as to generate a conversion key $rk_{i \to j}$ for converting a ciphertext encrypted with a public key $pk_i$ in the pair of the conversion source into a converted ciphertext that can be decrypted with a decryption key $sk_j$ in the pair of the (Continued)

conversion target. An output unit (413) outputs the conversion key $rk_{i \to j}$ generated by the conversion key generation unit (412).

13 Claims, 22 Drawing Sheets

(51) Int. Cl.
  *H04L 9/14* (2006.01)
  *H04L 9/32* (2006.01)

(56) References Cited

U.S. PATENT DOCUMENTS

| | | | |
|---|---|---|---|
| 2015/0043735 A1* | 2/2015 | Fujii | H04L 9/14 380/277 |
| 2015/0180661 A1 | 6/2015 | Fujii | |
| 2015/0372812 A1* | 12/2015 | Parann-Nissany | H04L 63/06 380/44 |
| 2016/0254914 A1* | 9/2016 | Saito | H04L 9/0894 713/153 |
| 2016/0380768 A1 | 12/2016 | Koike et al. | |
| 2017/0099263 A1* | 4/2017 | Matsuzaki | G06F 16/9535 |
| 2017/0366338 A1* | 12/2017 | Gajek | H04L 9/008 |
| 2017/0366519 A1* | 12/2017 | Rao | H04L 9/008 |
| 2018/0131512 A1* | 5/2018 | Gajek | H04L 9/3073 |

FOREIGN PATENT DOCUMENTS

| | | | |
|---|---|---|---|
| JP | 2015-169842 A | 9/2015 | |
| WO | WO 2012/169153 A1 | 12/2012 | |
| WO | WO-2014010202 A1 * | 2/2013 | |
| WO | WO-2014010202 A1 * | 7/2013 | ............ G09C 1/00 |
| WO | WO 2014/010202 A1 | 1/2014 | |
| WO | WO 2014/024956 A1 | 2/2014 | |
| WO | WO-2020174515 A1 * | 9/2020 | |

OTHER PUBLICATIONS

Brakerski et al., "Lattice-Based Fully Dynamic Multi-Key FHE with Short Ciphertexts," IACR-CRYPTO-2016, 2016, pp. 1-23.
International Search Report (PCT/ISA/210) issued in PCT/JP2017/047148, dated Apr. 3, 2018.
Peikert el al., "Multi-Key FHE from LWE, Revisited," IACR-TCC-2016, 2016, pp. 1-19.

* cited by examiner

CONVERSION KEY GENERATION DEVICE, CIPHERTEXT CONVERSION DEVICE, PRIVACY-PRESERVING INFORMATION PROCESSING SYSTEM, CONVERSION KEY GENERATION METHOD, CIPHERTEXT CONVERSION METHOD, AND COMPUTER

TECHNICAL FIELD

The present invention relates to a proxy re-encryption technique in homomorphic encryption.

BACKGROUND ART

Homomorphic encryption is an encryption technique that allows data to be operated on while the data remains encrypted. A process to operate on data while the data remains encrypted is called a homomorphic operation, and the types and the number of operations for which homomorphic operations are possible vary with each specific scheme. The use of homomorphic encryption allows data to be stored in a database on a cloud while the data remains encrypted, and further allows analysis, such as statistical processing, to be performed on the stored encrypted data without decrypting the data. As a result, the cloud can be used while securing privacy.

Homomorphic encryption has a property that ciphertexts have to be encrypted with the same public key in order to perform a homomorphic operation. Therefore, when a plurality of users store data on a cloud and further perform homomorphic operations on the stored data, all the users need to use a common key. Since all the users use the common key, a problem is that any user can decrypt the data.

Patent Literature 1 describes converting ciphertexts encrypted with different keys into ciphertexts encrypted with a specific single key by employing a technique, called proxy re-encryption, for converting a key with which data is encrypted. As a result, Patent Literature 1 allows ciphertexts to be converted into ciphertexts encrypted with the same specific key, and then allows a homomorphic operation to be performed on the ciphertexts. In addition, in Patent Literature 1, only a user who has the key after conversion by proxy re-encryption can decrypt a ciphertext resulting from the homomorphic operation.

That is, the technique described in Patent Literature 1 allows a homomorphic operation to be performed on ciphertexts encrypted with different keys. This solves the problem which is that all the users need to use the common key.

CITATION LIST

Patent Literature

Patent Literature 1: WO 2014/010202 A1

SUMMARY OF INVENTION

Technical Problem

However, in the technique described in Patent Literature 1, it is requisite that ciphertexts be converted by proxy re-encryption before performing a homomorphic operation. In other words, with the technique described in Patent Literature 1, a homomorphic operation cannot be performed on ciphertexts before proxy re-encryption is performed on the ciphertexts. For this reason, it is necessary to determine who is to be allowed to decrypt converted ciphertexts before a homomorphic operation is performed. Therefore, it is not possible to perform analysis by a homomorphic operation before an analyst is determined. In addition, a result of analysis by a homomorphic operation performed for a certain analyst cannot be analyzed by another analyst.

It is an object of the present invention to make it possible to realize a homomorphic encryption scheme in which after a homomorphic operation is performed on ciphertexts encrypted with different keys, a decrypting user can be controlled by proxy re-encryption.

Solution to Problem

A conversion key generation device according to the present invention includes
  a key acquisition unit to acquire a decryption key $sk_i$ in a pair of a conversion source and a public key $pk_j$ in a pair of a conversion target, out of a plurality of pairs of a decryption key and a public key; and
  a conversion key generation unit to encrypt the decryption key $sk_i$ acquired by the key acquisition unit with the public key $pk_j$, so as to generate a conversion key $rk_{i \to j}$ for converting a ciphertext encrypted with a public key $pk_i$ in the pair of the conversion source into a converted ciphertext that can be decrypted with a decryption key $sk_j$ in the pair of the conversion target.

Advantageous Effects of Invention

In the present invention, a decryption key $sk_i$ in a pair of a conversion source is encrypted with a public key $pk_j$ in a pair of a conversion target, so as to generate a conversion key $rk_{i \to j}$ for converting a ciphertext encrypted with a public key $pk_i$ into a converted ciphertext that can be decrypted with a decryption key $sk_j$ in the pair of the conversion target. By using this conversion key $rk_{i \to j}$, it is possible to allow control of a decryption key that can decrypt a ciphertext resulting from performing a homomorphic operation on ciphertexts encrypted with different keys.

DESCRIPTION OF EMBODIMENTS

First Embodiment

Description of Configuration

Figure 1:
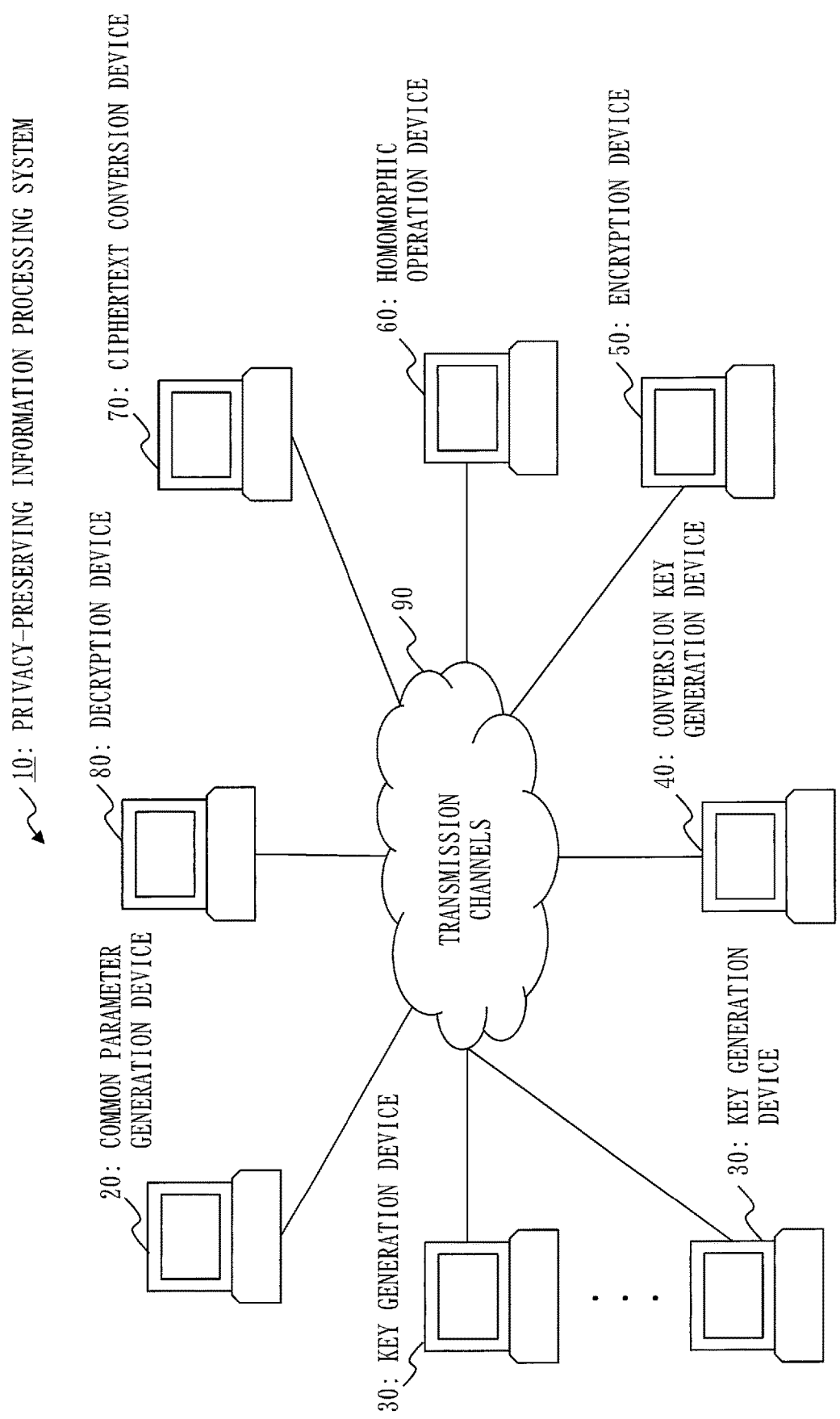
FIG. 1 is a configuration diagram of a privacy-preserving information processing system 10 according to a first embodiment.

A configuration of a privacy-preserving information processing system 10 according to a first embodiment will be described with reference to FIG. 1.

The privacy-preserving information processing system 10 includes a common parameter generation device 20, a plurality of key generation devices 30, a conversion key generation device 40, an encryption device 50, a homomorphic operation device 60, a ciphertext conversion device 70, and a plurality of decryption devices 80.

The common parameter generation device 20, the key generation devices 30, the conversion key generation device 40, the encryption device 50, the homomorphic operation device 60, the ciphertext conversion device 70, and the decryption devices 80 are connected via transmission channels 90. A specific example of the transmission channels 90 is the Internet or a local area network (LAN).

A configuration of the common parameter generation device 20 according to the first embodiment will be described with reference to FIG. 2.

The common parameter generation device 20 includes hardware of a processor 21, a memory 22, a storage 23, and a communication interface 24. The processor 21 is connected with the other hardware components via signal lines and controls the other hardware components.

The common parameter generation device 20 includes, as functional components, an acquisition unit 211, a common parameter generation unit 212, and an output unit 213. The functions of the functional components of the common parameter generation device 20 are realized by software.

The storage 23 stores programs for realizing the functions of the functional components of the common parameter generation device 20. These programs are loaded into the memory 22 by the processor 21 and executed by the processor 21. This realizes the functions of the functional components of the common parameter generation device 20.

The storage 23 realizes the function of a parameter storage unit 231.

Figure 3:
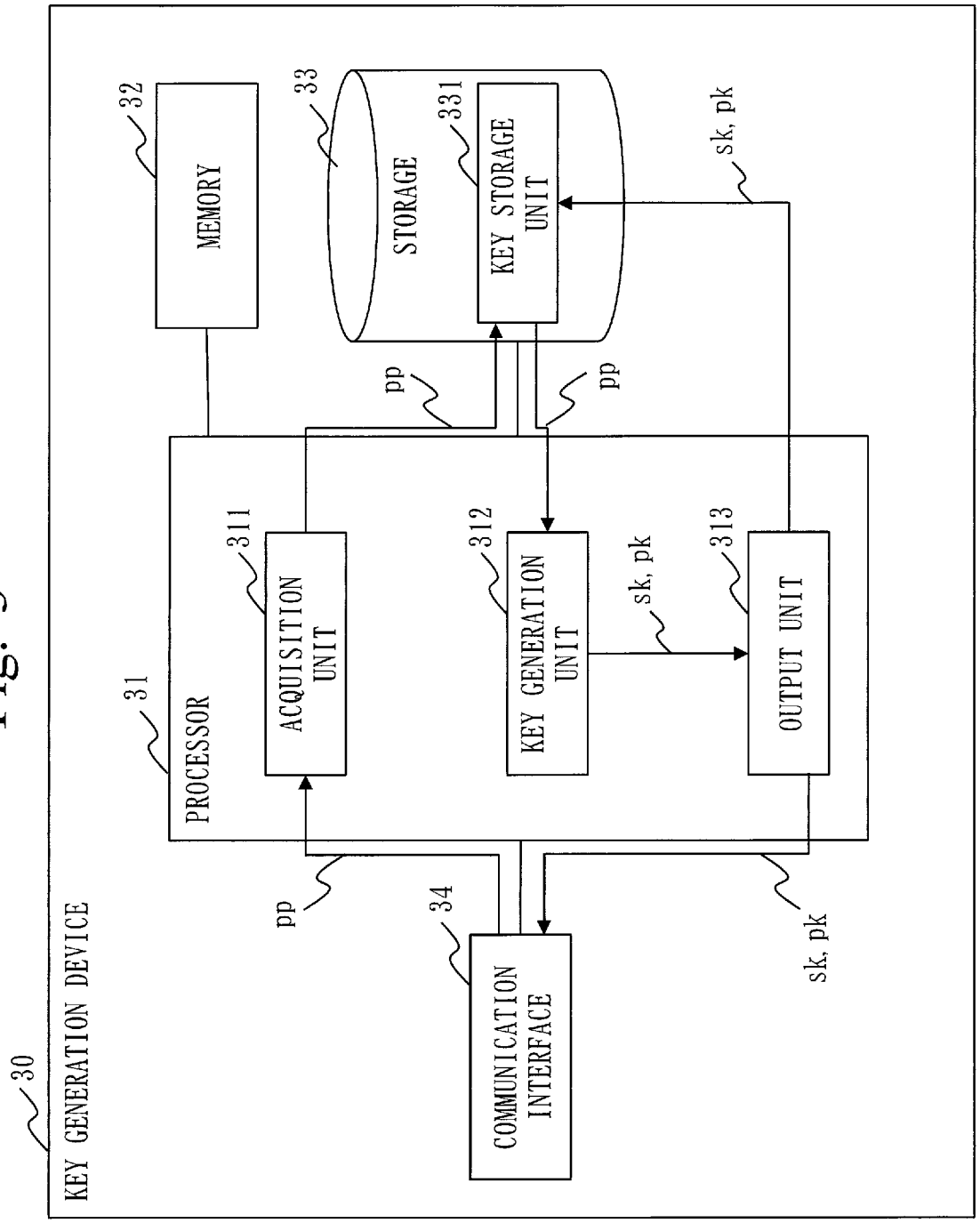
FIG. 3 is a configuration diagram of a key generation device 30 according to the first embodiment.

A configuration of the key generation device 30 according to the first embodiment will be described with reference to FIG. 3.

The key generation device 30 includes hardware of a processor 31, a memory 32, a storage 33, and a communication interface 34. The processor 31 is connected with the other hardware components via signal lines and controls the other hardware components.

The key generation device 30 includes, as functional components, an acquisition unit 311, a key generation unit 312, and an output unit 313. The functions of the functional components of the key generation device 30 are realized by software.

The storage 33 stores programs for realizing the functions of the functional components of the key generation device 30. These programs are loaded into the memory 32 by the processor 31 and executed by the processor 31. This realizes the functions of the functional components of the key generation device 30.

The storage 33 realizes the function of a key storage unit 331.

Figure 4:
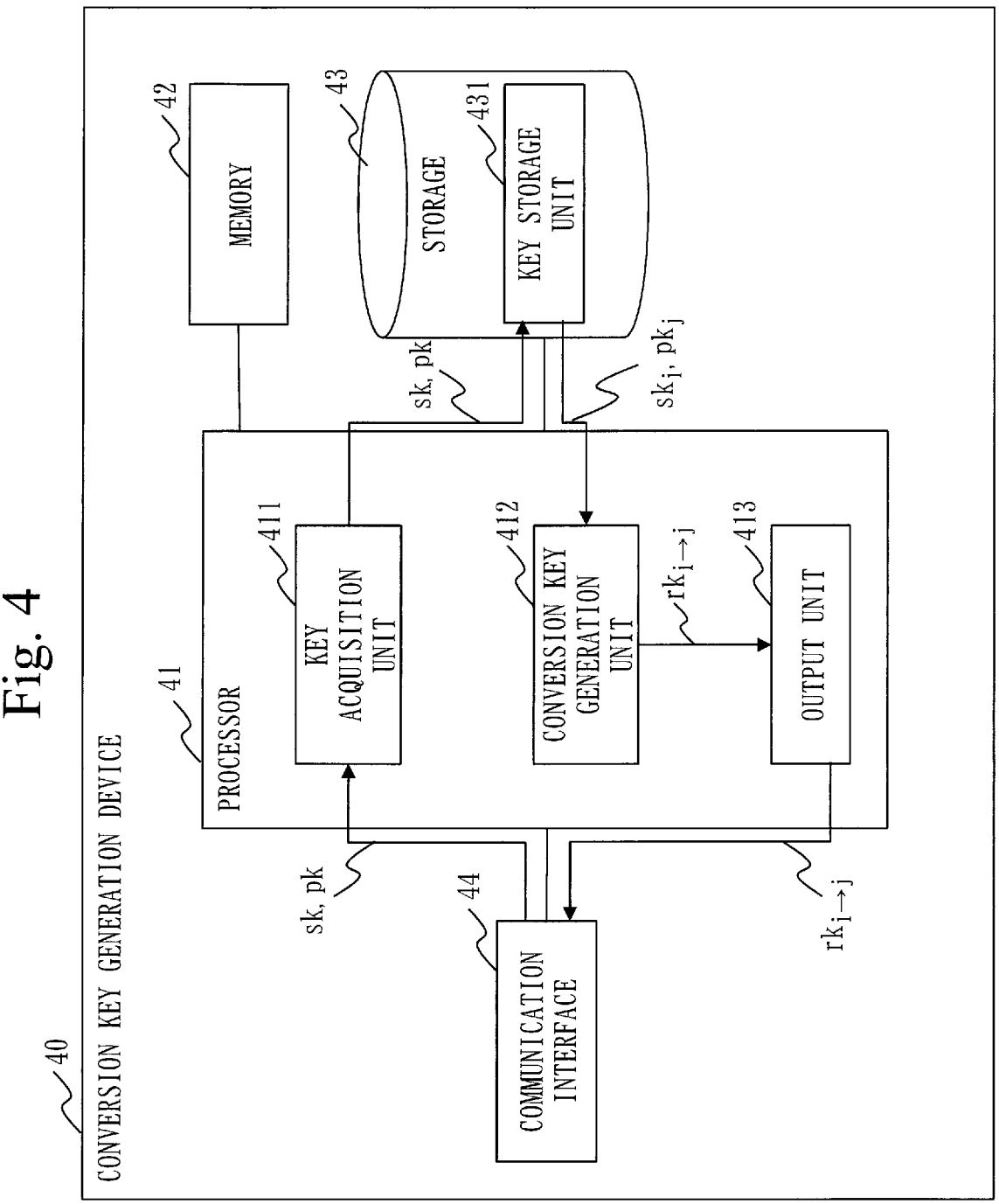
FIG. 4 is a configuration diagram of a conversion key generation device 40 according to the first embodiment.

A configuration of the conversion key generation device 40 according to the first embodiment will be described with reference to FIG. 4.

The conversion key generation device 40 includes hardware of a processor 41, a memory 42, a storage 43, and a communication interface 44. The processor 41 is connected with the other hardware components via signal lines and controls the other hardware components.

The conversion key generation device 40 includes, as functional components, a key acquisition unit 411, a conversion key generation unit 412, and an output unit 413. The functions of the functional components of the conversion key generation device 40 are realized by software.

The storage 43 stores programs for realizing the functions of the functional components of the conversion key generation device 40. These programs are loaded into the memory 42 by the processor 41 and executed by the processor 41. This realizes the functions of the functional components of the conversion key generation device 40.

The storage 43 realizes the function of a key storage unit 431.

Figure 5:
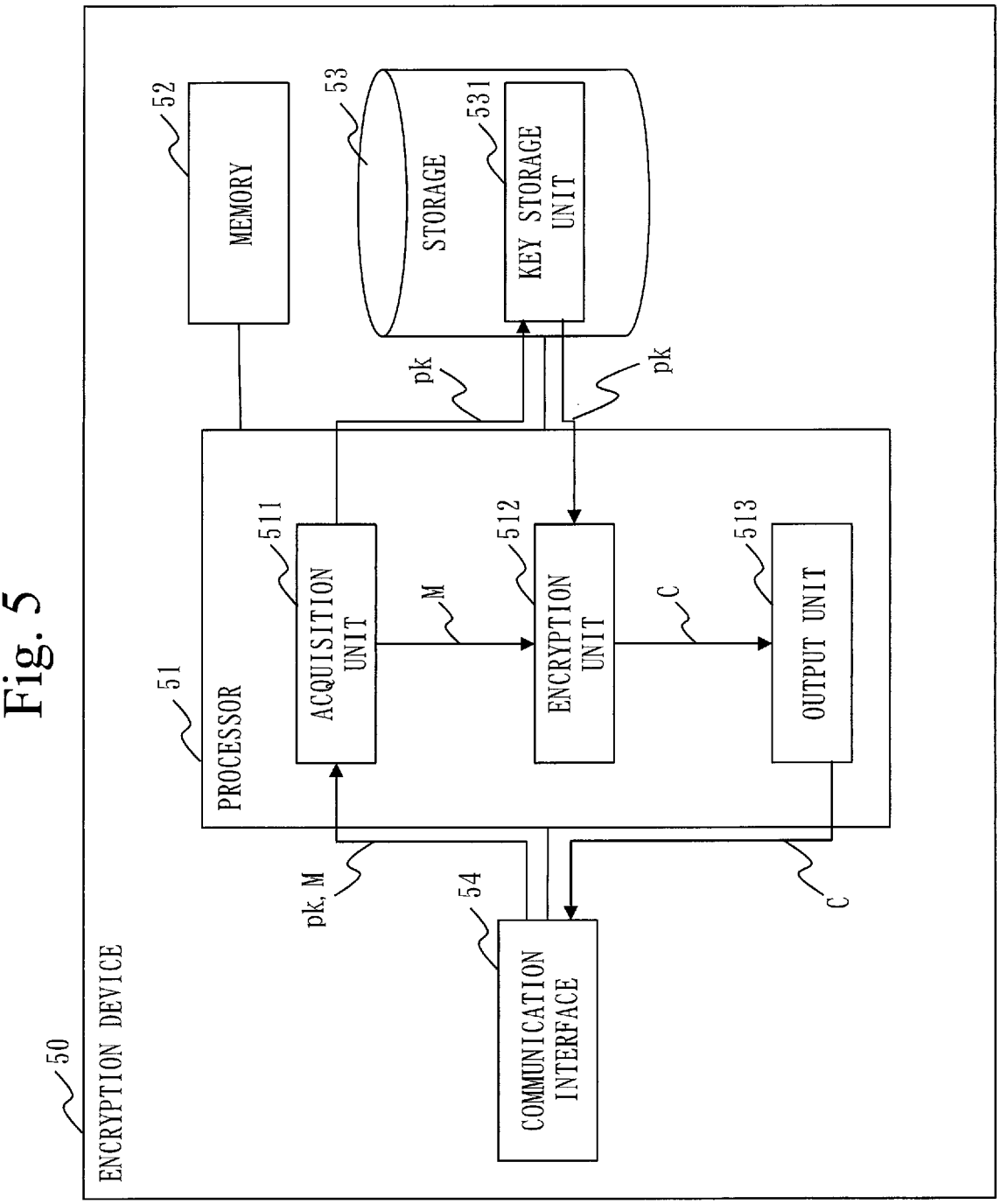
FIG. 5 is a configuration diagram of an encryption device 50 according to the first embodiment.

A configuration of the encryption device 50 according to the first embodiment will be described with reference to FIG. 5.

The encryption device 50 includes hardware of a processor 51, a memory 52, a storage 53, and a communication interface 54. The processor 51 is connected with the other hardware components via signal lines and controls the other hardware components.

The encryption device 50 includes, as functional components, an acquisition unit 511, an encryption unit 512, and an output unit 513. The functions of the functional components of the encryption device 50 are realized by software.

The storage 53 stores programs for realizing the functions of the functional components of the encryption device 50. These programs are loaded into the memory 52 by the processor 51 and executed by the processor 51. This realizes the functions of the functional components of the encryption device 50.

The storage 53 realizes the function of a key storage unit 531.

Figure 6:
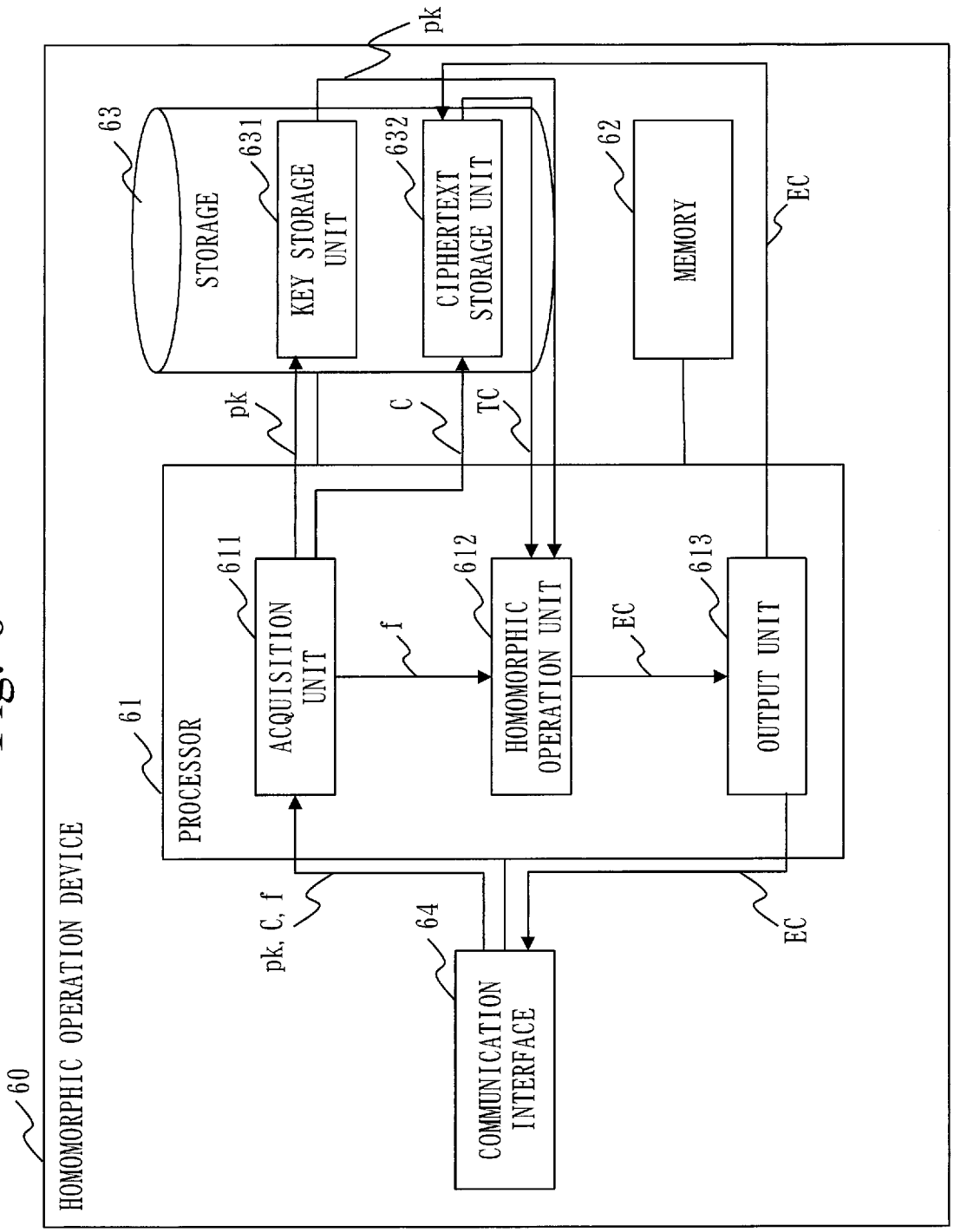
FIG. 6 is a configuration diagram of a homomorphic operation device 60 according to the first embodiment.

A configuration of the homomorphic operation device 60 according to the first embodiment will be described with reference to FIG. 6.

The homomorphic operation device 60 includes hardware of a processor 61, a memory 62, a storage 63, and a communication interface 64. The processor 61 is connected with the other hardware components via signal lines and controls the other hardware components.

The homomorphic operation device 60 includes, as functional components, an acquisition unit 611, a homomorphic operation unit 612, and an output unit 613. The functions of the functional components of the homomorphic operation device 60 are realized by software.

The storage 63 stores programs for realizing the functions of the functional components of the homomorphic operation device 60. These programs are loaded into the memory 62 by the processor 61 and executed by the processor 61. This realizes the functions of the functional components of the homomorphic operation device 60.

The storage 63 realizes the functions of a key storage unit 631 and a ciphertext storage unit 632.

Figure 7:
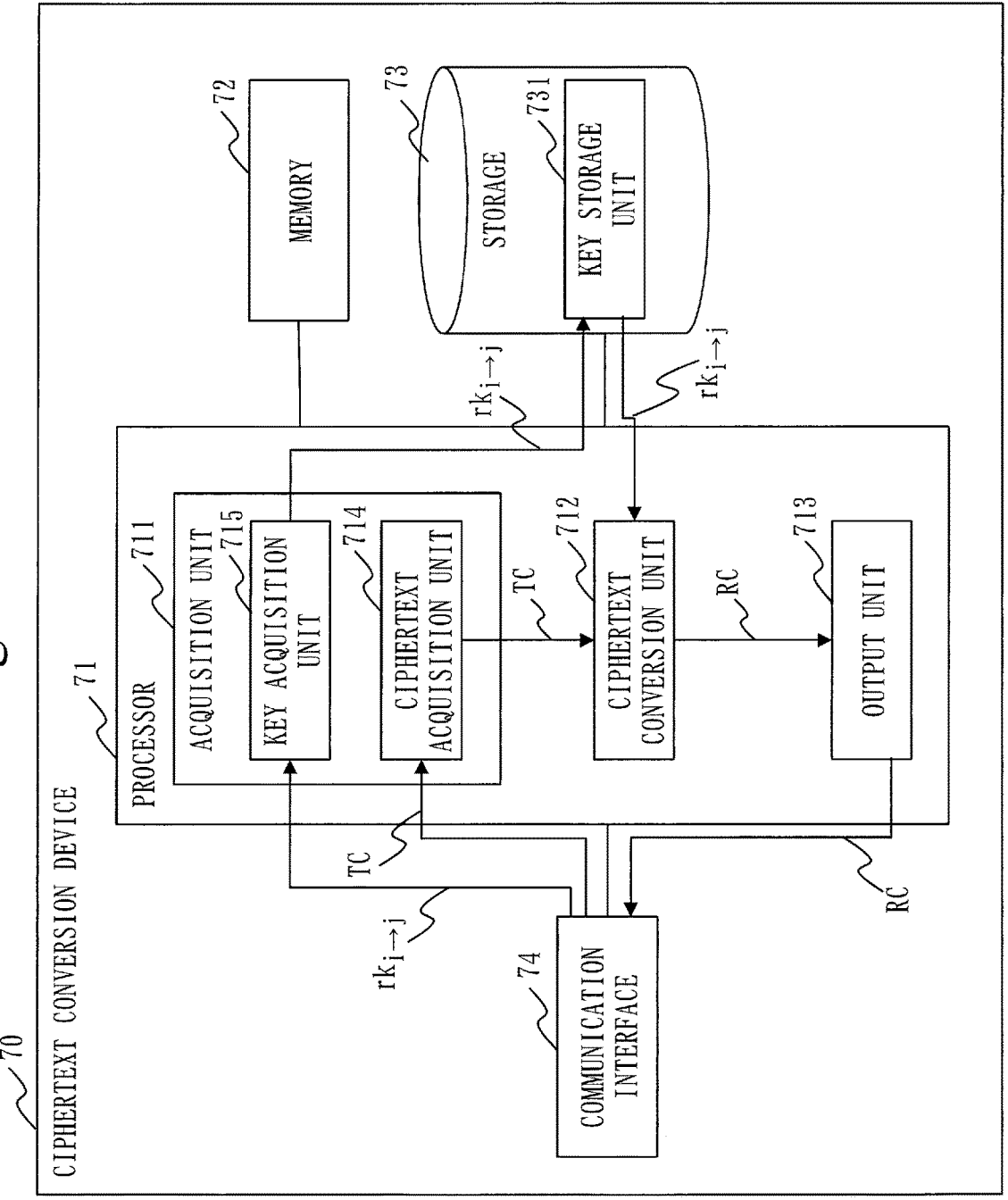
FIG. 7 is a configuration diagram of a ciphertext conversion device 70 according to the first embodiment.

A configuration of the ciphertext conversion device 70 according to the first embodiment will be described with reference to FIG. 7.

The ciphertext conversion device 70 includes hardware of a processor 71, a memory 72, a storage 73, and a communication interface 74. The processor 71 is connected with the other hardware components via signal lines and controls the other hardware components.

The ciphertext conversion device 70 includes, as functional components, an acquisition unit 711, a ciphertext conversion unit 712, and an output unit 713. The acquisition unit 711 includes a ciphertext acquisition unit 714 and a key acquisition unit 715. The functions of the functional components of the ciphertext conversion device 70 are realized by software.

The storage 73 stores programs for realizing the functions of the functional components of the ciphertext conversion device 70. These programs are loaded into the memory 72 by the processor 71 and executed by the processor 71. This realizes the functions of the functional components of the ciphertext conversion device 70.

The storage 73 realizes the function of a key storage unit 731.

Figure 8:
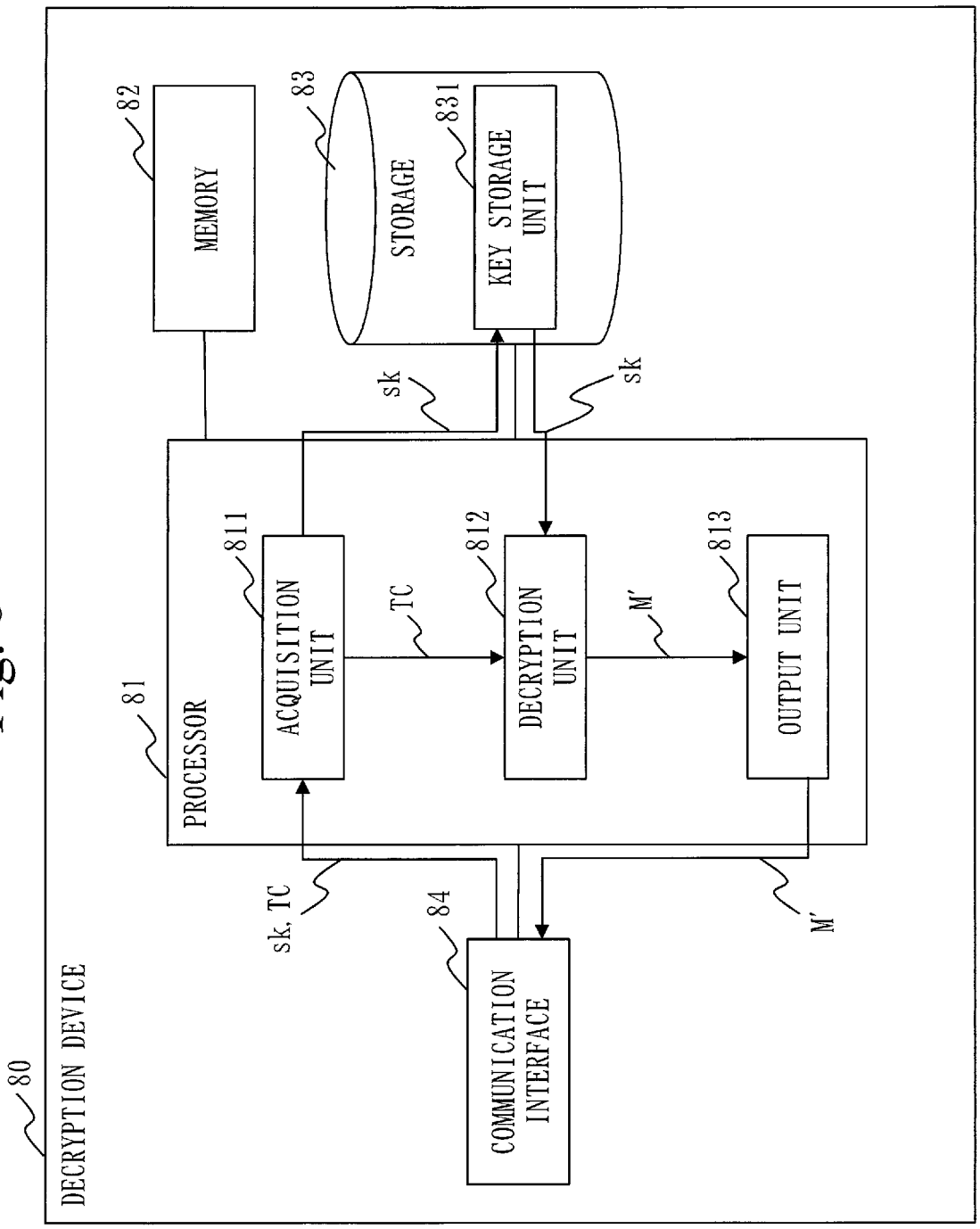
FIG. 8 is a configuration diagram of a decryption device 80 according to the first embodiment.

A configuration of the decryption device 80 according to the first embodiment will be described with reference to FIG. 8.

The decryption device 80 includes hardware of a processor 81, a memory 82, a storage 83, and a communication interface 84. The processor 81 is connected with the other hardware components via signal lines and controls the other hardware components.

The decryption device 80 includes, as functional components, an acquisition unit 811, a decryption unit 812, and an output unit 813. The functions of the functional components of the decryption device 80 are realized by software.

The storage 83 stores programs for realizing the functions of the functional components of the decryption device 80. These programs are loaded into the memory 82 by the processor 81 and executed by the processor 81. This realizes the functions of the functional components of the decryption device 80.

The storage 83 realizes the function of a key storage unit 831.

Each of the processors 21, 31, 41, 51, 61, 71, and 81 is an integrated circuit (IC) that performs arithmetic processing. As a specific example, each of the processors 21, 31, 41, 51, 61, 71, and 81 is a central processing unit (CPU), a digital signal processor (DSP), or a graphics processing unit (GPU).

Each of the memories 22, 32, 42, 52, 62, 72, and 82 is a storage device to temporarily store data. As a specific example, each of the memories 22, 32, 42, 52, 62, 72, and 82 is a static random access memory (SRAM) or a dynamic random access memory (DRAM).

Each of the storages 23, 33, 43, 53, 63, 73, and 83 is a storage device to store data. As a specific example, each of the storages 23, 33, 43, 53, 63, 73, and 83 is a hard disk drive (HDD). Alternatively, each of the storages 23, 33, 43, 53, 63, 73, and 83 may be a portable storage medium, such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

Each of the communication interfaces 24, 34, 44, 54, 64, 74, and 84 is an interface for communicating with external devices. As a specific example, each of the communication interfaces 24, 34, 44, 54, 64, 74, and 84 is an Ethernet (registered trademark) port, a Universal Serial Bus (USB) port, or a High-Definition Multimedia Interface (HDMI, registered trademark) port.

Figure 2:
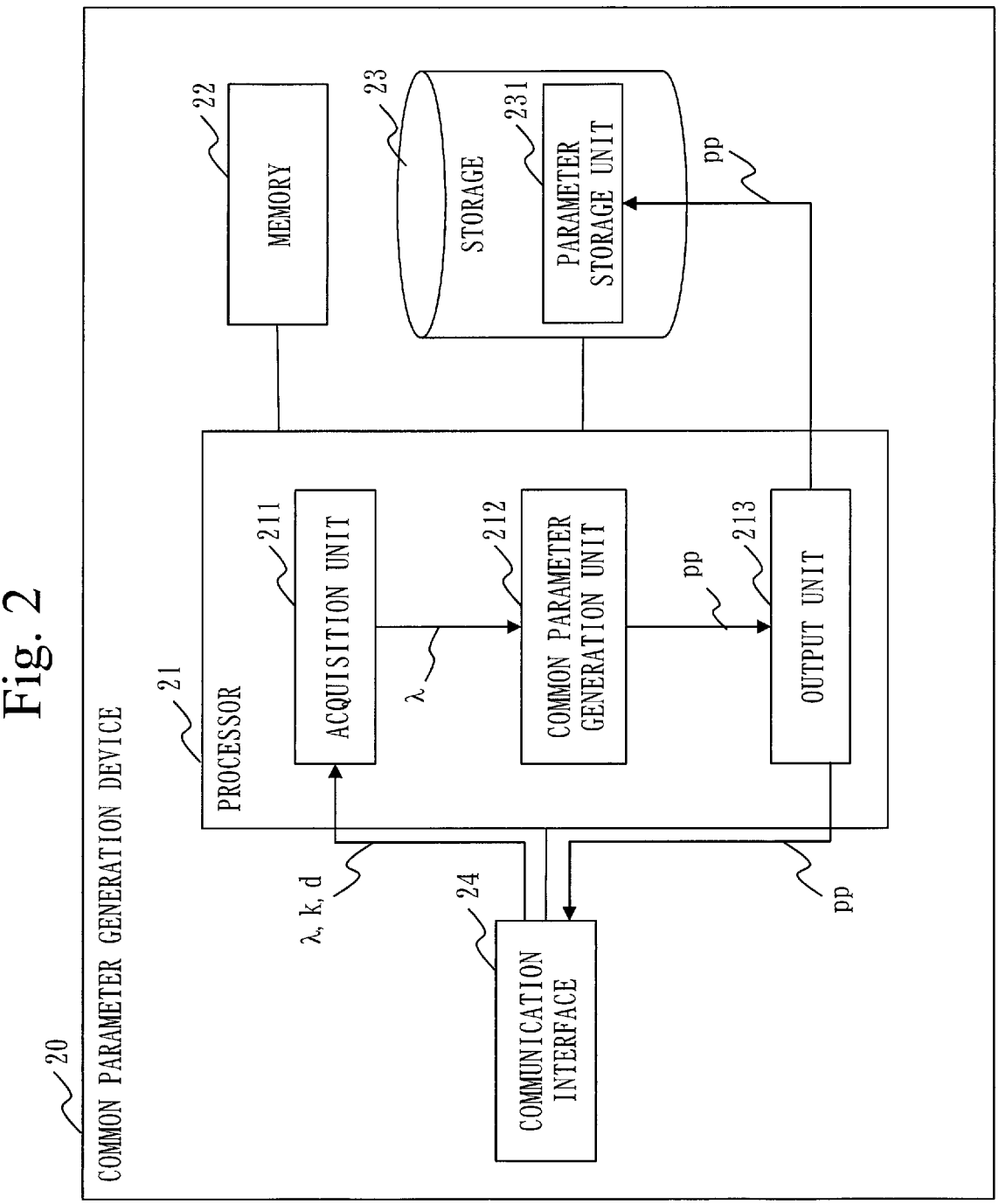
FIG. 2 is a configuration diagram of a common parameter generation device 20 according to the first embodiment.

FIG. 2 illustrates only one processor 21. However, the common parameter generation device 20 may include a plurality of processors as an alternative to the processor 21. Similarly, the key generation device 30 may include a plurality of processors as an alternative to the processor 31. The conversion key generation device 40 may include a plurality of processors as an alternative to the processor 41. The encryption device 50 may include a plurality of processors as an alternative to the processor 51. The homomorphic operation device 60 may include a plurality of processors as an alternative to the processor 61. The ciphertext conversion device 70 may include a plurality of processors as an alternative to the processor 71. The decryption device 80 may include a plurality of processors as an alternative to the processor 81.

The plurality of processors share the execution of the programs for realizing the functions of the functional components. Each of the plurality of processors is, like the processors 21, 31, 41, 51, 61, 71, and 81, an IC that performs arithmetic processing.

Description of Operation

Operation of the privacy-preserving information processing system 10 according to the first embodiment will be described with reference to FIGS. 9 to 15.

The operation of the privacy-preserving information processing system 10 according to the first embodiment corresponds to a privacy-preserving information processing method according to the first embodiment. The operation of the privacy-preserving information processing system 10 according to the first embodiment also corresponds to processes of a privacy-preserving information processing program according to the first embodiment.

In the first embodiment, the privacy-preserving information processing system 10 employs existing multi-key homomorphic encryption. As the existing multi-key homomorphic encryption, it is possible to employ schemes described in documents such as [Non-Patent Literature 1: C. Peikert and S. Shiehian. "Multi-Key FHE from LWE, Revisited". In TCC, 2016.] and [Non-Patent Literature 2: Z. Brakerski and R. Perlman. "Lattice-based fully dynamic multi-key FHE with short ciphertexts". In CRYPTO, 2016].

The multi-key homomorphic encryption includes a Setup algorithm, a KG algorithm, an Enc algorithm, a Dec algorithm, and an Eval algorithm. The Setup algorithm is an algorithm that generates a common parameter. The KG algorithm is an algorithm that generates a pair of a decryption key and a public key. The Enc algorithm is an algorithm that encrypts data to generate a ciphertext. The Dec algorithm is an algorithm that decrypts a ciphertext. The Eval algorithm is an algorithm that performs a homomorphic operation.

Figure 9:
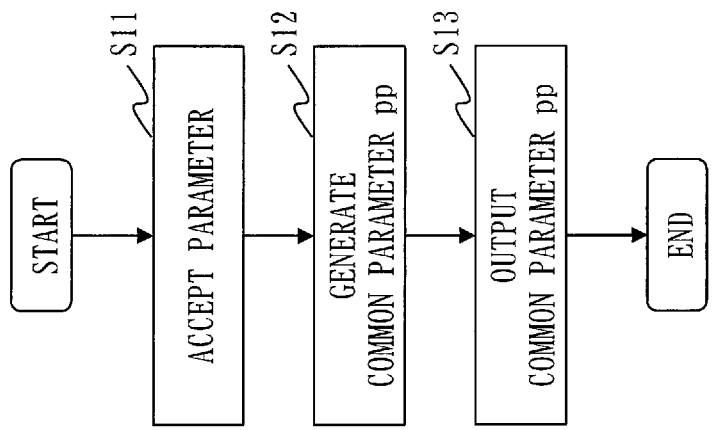
FIG. 9 is a flowchart illustrating operation of the common parameter generation device 20 according to the first embodiment.

Operation of the common parameter generation device 20 according to the first embodiment will be described with reference to FIG. 9.

The operation of the common parameter generation device 20 according to the first embodiment corresponds to a common parameter generation method according to the first embodiment. The operation of the common parameter generation device 20 according to the first embodiment also corresponds to processes of a common parameter generation program according to the first embodiment.

Step S11: Acquisition Process

The acquisition unit 211 accepts an input of a parameter necessary for generating a common parameter. Specific examples of the parameter are a security parameter λ, the number k of keys, and a Boolean circuit depth d in Non-Patent Literature 1. The acquisition unit 211 writes the acquired parameter in the memory 22.

Step S12: Common Parameter Generation Process

The common parameter generation unit 212 retrieves the parameter acquired in step S11 from the memory 22. The common parameter generation unit 212 executes the Setup algorithm in the multi-key homomorphic encryption, taking as input the retrieved parameter, so as to generate a common parameter pp. The common parameter generation unit 212 writes the generated common parameter pp in the memory 22.

Step S13: Output Process

The output unit 213 retrieves the common parameter pp generated in step S12 from the memory 22. The output unit 213 writes the retrieved common parameter pp in the storage 23.

The output unit 213 transmits the common parameter pp to each of the key generation devices 30 via the communication interface 24. In each of the key generation devices 30, the acquisition unit 311 receives the common parameter pp via the communication interface 34, and writes the common parameter pp in the key storage unit 331.

Figure 10:
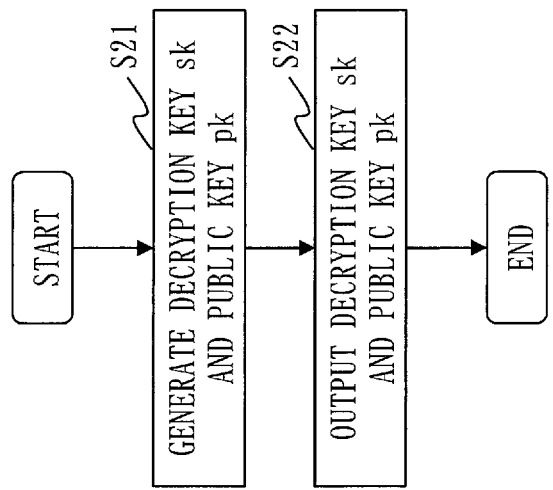
FIG. 10 is a flowchart illustrating operation of the key generation device 30 according to the first embodiment.

Operation of the key generation device 30 according to the first embodiment will be described with reference to FIG. 10.

The operation of the key generation device 30 according to the first embodiment corresponds to a key generation method according to the first embodiment. The operation of the key generation device 30 according to the first embodiment also corresponds to processes of a key generation program according to the first embodiment.

Step S21: Key Generation Process

The key generation unit 312 retrieves the common parameter pp from the key storage unit 331. The key generation unit 312 executes the KG algorithm in the multi-key homomorphic encryption, taking as input the retrieved common parameter pp, so as to generate a pair of a decryption key sk and a public key pk. The key generation unit 312 writes the generated pair of the decryption key sk and the public key pk in the memory 32.

Step S22: Output Process

The output unit 313 retrieves the pair of the decryption key sk and the public key pk generated in step S21 from the memory 32. The output unit 313 writes the retrieved pair of the decryption key sk and the public key pk in the key storage unit 331.

The output unit 313 transmits the public key pk to the conversion key generation device 40, the encryption device 50, and the homomorphic operation device 60 via the communication interface 34. Then, in the conversion key generation device 40, the key acquisition unit 411 receives the public key pk via the communication interface 44, and writes the public key pk in the key storage unit 431. Similarly, in the encryption device 50, the acquisition unit 511 receives the public key pk via the communication interface 54, and writes the public key pk in the key storage unit 531. Similarly, in the homomorphic operation device 60, the acquisition unit 611 receives the public key pk via the communication interface 64, and writes the public key pk in the key storage unit 631.

The output unit 313 transmits the decryption key sk to the conversion key generation device 40 and a corresponding one of the decryption devices 80 via the communication interface 34. The corresponding one of the decryption devices 80 is the decryption device 80 that is assigned to the user of the decryption key sk. The key generation devices 30 and the decryption devices 80 are associated on a one-to-one basis herein, and the decryption key sk is transmitted to the decryption device 80 associated with the key generation device 30 that has generated the decryption key sk. Then, in the conversion key generation device 40, the key acquisition unit 411 receives the decryption key sk via the communication interface 44, and writes the decryption key sk in the key storage unit 431. Similarly, in the decryption device 80, the acquisition unit 811 receives the decryption key sk via the communication interface 84, and writes the decryption key sk in the key storage unit 831.

In the following description, the decryption key sk generated by the ι-th key generation device 30 of the plurality of key generation devices 30 will be referred to as a decryption key $sk_\iota$, and the public key pk generated by the ι-th key generation device 30 will be referred to as a public key $pk_\iota$.

Figure 11:
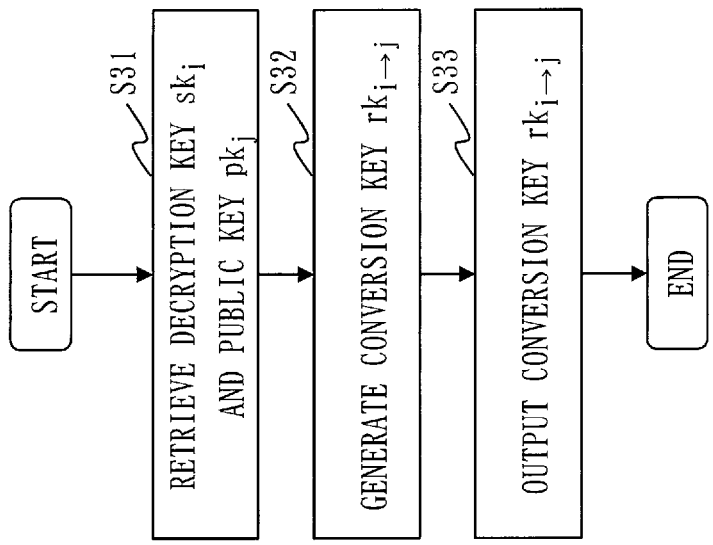
FIG. 11 is a flowchart illustrating operation of the conversion key generation device 40 according to the first embodiment.

Operation of the conversion key generation device 40 according to the first embodiment will be described with reference to FIG. 11.

The operation of the conversion key generation device 40 according to the first embodiment corresponds to a conversion key generation method according to the first embodiment. The operation of the conversion key generation device 40 according to the first embodiment also corresponds to processes of a conversion key generation program according to the first embodiment.

A case in which a conversion key $rk_{i \to j}$ is generated will be described here. The conversion key $rk_{i \to j}$ is a key for converting a ciphertext encrypted with a public key $pk_i$ generated by the i-th key generation device 30 into a ciphertext that can be decrypted with a decryption key $sk_j$ generated by the j-th key generation device 30.

Step S31: Key Acquisition Process

The key acquisition unit 411 retrieves a decryption key $sk_i$ in a pair of a conversion source and a public key $pk_j$ in a pair of a conversion target, out of a plurality of pairs of a decryption key and a public key stored in the key storage unit 431. The key acquisition unit 411 writes the retrieved decryption key $sk_i$ and public key $pk_j$ in the memory 42.

Step S32: Conversion Key Generation Process

The conversion key generation unit 412 retrieves the decryption key $sk_i$ and the public key $pk_j$ from the memory 42. The conversion key generation unit 412 executes an RKGen algorithm in the multi-key homomorphic encryption, taking as input the retrieved decryption key $sk_i$ and public key $pk_j$, so as to encrypt the decryption key $sk_i$ with the public key $pk_j$ to generate a conversion key $rk_{i \to j}$. The conversion key $rk_{i \to j}$ is a key for converting a ciphertext encrypted with a public key $pk_i$ in the pair of the conversion source into a converted ciphertext that can be decrypted with a decryption key $sk_j$ in the pair of the conversion target. The conversion key generation unit 412 writes the generated conversion key $rk_{i \to j}$ in the memory 42.

Step S33: Output Generation Process

The output unit 413 retrieves the conversion key $rk_{i \to j}$ generated in step S32 from the memory 42. The output unit 413 transmits the retrieved conversion key $rk_{i \to j}$ to the ciphertext conversion device 70 via the communication interface 44. Then, in the ciphertext conversion device 70, the acquisition unit 711 receives the conversion key $rk_{i \to j}$ via the communication interface 74, and writes the conversion key $rk_{i \to j}$ in the key storage unit 731.

Figure 12:
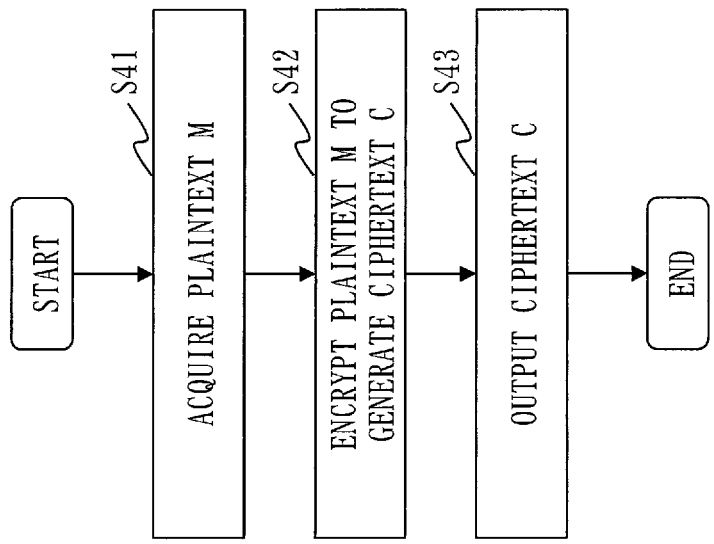
FIG. 12 is a flowchart illustrating operation of the encryption device 50 according to the first embodiment.

Operation of the encryption device 50 according to the first embodiment will be described with reference to FIG. 12.

The operation of the encryption device 50 according to the first embodiment corresponds to an encryption method according to the first embodiment. The operation of the encryption device 50 according to the first embodiment also corresponds to processes of an encryption program according to the first embodiment.

Step S41: Acquisition Process

The acquisition unit 511 acquires a plaintext M to be encrypted via the communication interface 54. The acquisition unit 511 writes the acquired plaintext M in the memory 52.

Step S42: Encryption Process

The encryption unit 512 retrieves the plaintext M acquired in step S41 from the memory 52. The encryption unit 512 retrieves the public key pk from the key storage unit 531. The encryption unit 512 executes the Enc algorithm in the multi-key homomorphic encryption, taking as input the retrieved plaintext M and public key pk, so as to encrypt the plaintext M with the public key pk to generate a ciphertext C. The encryption unit 512 writes the generated ciphertext C in the memory 52.

Step S43: Output Process

The output unit 513 retrieves the ciphertext C generated in step S42 from the memory 52. The output unit 513 transmits the retrieved ciphertext C to the homomorphic operation device 60 via the communication interface 54. Then, in the homomorphic operation device 60, the acquisition unit 611 receives the ciphertext C via the communication interface 64, and writes the ciphertext C in the ciphertext storage unit 632.

Figure 13:
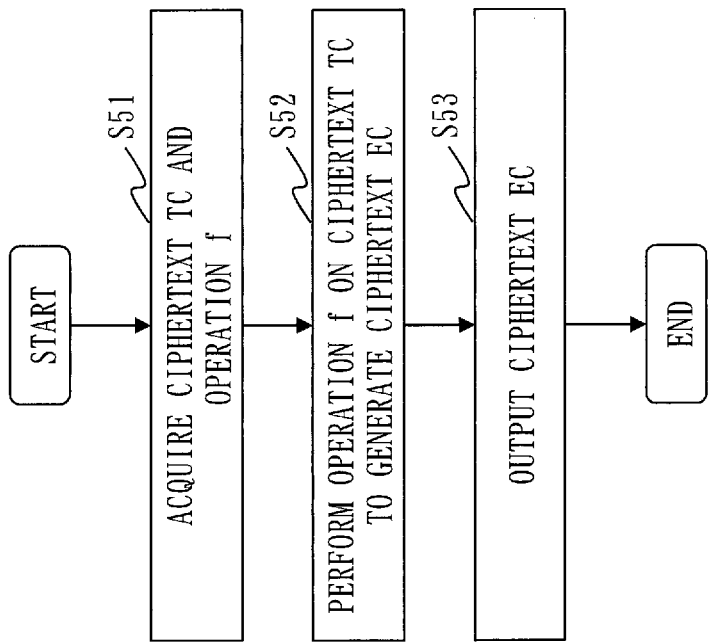
FIG. 13 is a flowchart illustrating operation of the homomorphic operation device 60 according to the first embodiment.

Operation of the homomorphic operation device 60 according to the first embodiment will be described with reference to FIG. 13.

The operation of the homomorphic operation device 60 according to the first embodiment corresponds to a homomorphic operation method according to the first embodiment. The operation of the homomorphic operation device 60 according to the first embodiment also corresponds to processes of a homomorphic operation program according to the first embodiment.

Step S51: Acquisition Process

The acquisition unit 611 retrieves a ciphertext TC, to he processed from the ciphertext storage unit 632. The acquisition unit 611 acquires an operation f that indicates details of an operation via the communication interface 64. The operation f is input, for example, by the user of the homomorphic operation device 60 via an input device. The acquisition unit 611 writes the retrieved ciphertext TC and the acquired operation fin the memory 62.

There may be one ciphertext TC to be processed or a plurality of ciphertexts TC to be processed. The ciphertext TC to be processed is at least one of a ciphertext C generated by the encryption device 50 and a ciphertext EC resulting from performing a homomorphic operation by the homomorphic operation device 60.

Step S52: Homomorphic Operation Process

The homomorphic operation unit 612 retrieves, from the memory 62, the ciphertext TC retrieved in step S51 and the operation f acquired in step S51. The homomorphic operation unit 612 retrieves the public key pk that has been used to encrypt the ciphertext TC from the key storage unit 631. The homomorphic operation unit 612 executes the Eval algorithm in the multi-key homomorphic encryption, taking as input the retrieved ciphertext TC, operation f, and public key pk, so as to generate a ciphertext EC resulting from performing the operation f on the ciphertext TC. The homomorphic operation unit 612 writes the generated ciphertext EC in the memory 62.

Step S53: Output Process

The output unit 613 retrieves the ciphertext EC generated in step S52 from the memory 62. The output unit 613 writes the retrieved ciphertext EC in the ciphertext storage unit 632.

Figure 14:
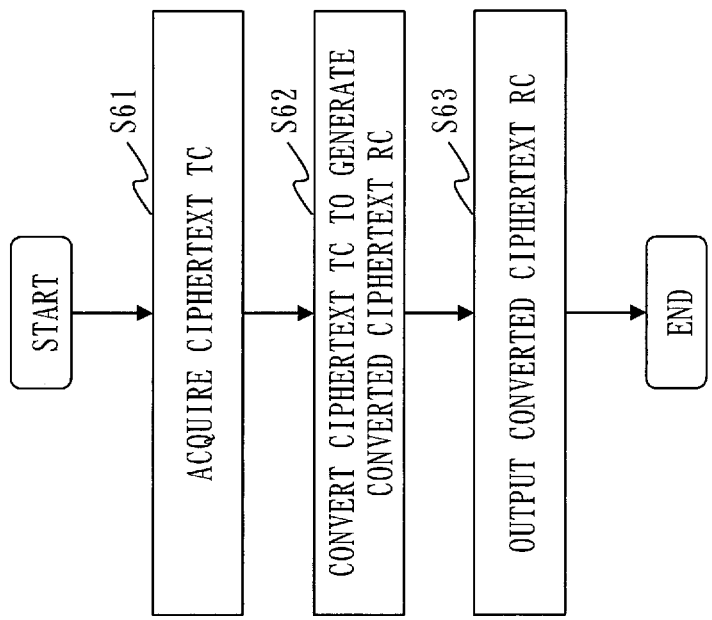
FIG. 14 is a flowchart illustrating operation of the ciphertext conversion device 70 according to the first embodiment.

Operation of the ciphertext conversion device 70 according to the first embodiment will be described with reference to FIG. 14.

The operation of the ciphertext conversion device 70 according to the first embodiment corresponds to a ciphertext conversion method according to the first embodiment, and also corresponds to processes of a ciphertext conversion program according to the first embodiment.

Step S61: Acquisition Process

The acquisition unit 711 acquires a ciphertext IC to be processed from the homomorphic operation device 60 via the communication interface 74. Specifically, the acquisition unit 711 transmits an identifier of the ciphertext TC to be processed to the homomorphic operation device 60, and acquires the ciphertext TC transmitted as a response. The acquisition unit 811 writes the acquired ciphertext IC in the memory 72.

The ciphertext TC to be processed is at least one of a ciphertext IC generated by the encryption device 50 and a ciphertext EC resulting from performing a homomorphic operation by the homomorphic operation device 60.

It is assumed here that the ciphertext TC to be processed is a ciphertext EC generated by performing a homomorphic operation on a ciphertext encrypted with the public key $pk_i$ for each integer i of i=1, . . . , s. It is also assumed that the ciphertext TC to be processed is to be converted into a ciphertext that can be decrypted with the decryption key $sk_j$ generated by the j-th key generation device 30.

Step S62: Ciphertext Conversion Process

The ciphertext conversion unit 712 decrypts the ciphertext TC to be processed by a homomorphic operation, using the decryption key in the pair of the conversion source, that is, the decryption key $sk_i$ for each integer i of i=1, . . . , s, so as to generate a converted ciphertext RC.

Specifically, the ciphertext conversion unit 712 executes the Enc algorithm in the multi-key homomorphic encryption, taking as input the public key $pk_j$ in the pair of the conversion target and the ciphertext TC, so as to encrypt the ciphertext TC with the public key $pk_j$ to generate a ciphertext C*. The ciphertext conversion unit 712 executes the Eval algorithm in the multi-key homomorphic encryption, taking as input the ciphertext C*, an operation $f_{Dec}$, the public key $pk_j$, and the conversion key $rk_{i \rightarrow j}$ for each integer i of i=1, . . . , s, so as to generate the converted ciphertext RC resulting from performing the operation $f_{Dec}$ on the ciphertext C*.

Note that the operation $f_{Dec}$ is an operation representing the Dec algorithm in the multi-key homomorphic encryption. That is, the execution of the Eval algorithm in the multi-key homomorphic encryption, using as input the ciphertext C*, the operation $f_{Dec}$, the public key $pk_j$, and the conversion key $rk_{i \rightarrow j}$ for each integer i of i=1, . . . , s, causes the ciphertext C* to be decrypted with the decryption key $sk_i$ embedded in the conversion key $rk_{i \rightarrow j}$. That is, the ciphertext C* is decrypted with the decryption key $sk_i$ by the homomorphic operation.

Step S63: Output Process

The output unit 713 retrieves the converted ciphertext RC generated in step S62 from the memory 72. The output unit 713 transmits the retrieved converted ciphertext RC to the homomorphic operation device 60 via the communication interface 74. Then, in the homomorphic operation device 60, the acquisition unit 611 receives the converted ciphertext RC via the communication interface 64, and writes the converted ciphertext RC in the ciphertext storage unit 632.

Figure 15:
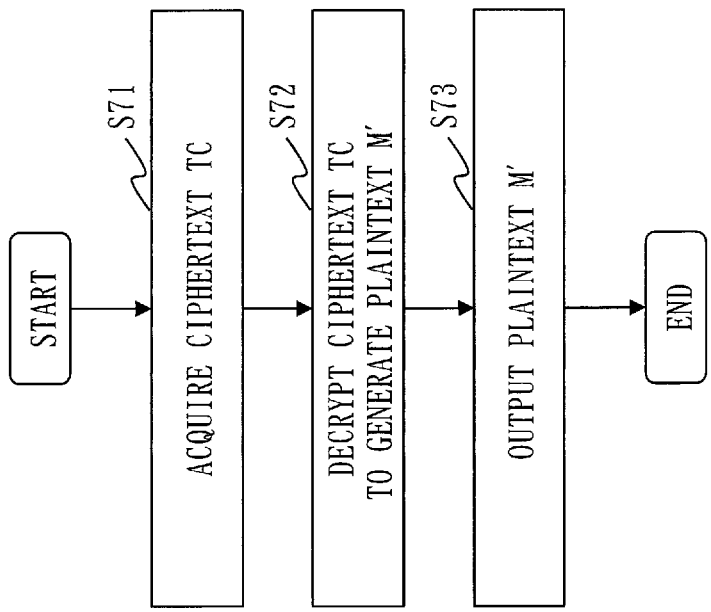
FIG. 15 is a flowchart illustrating operation of the decryption device 80 according to the first embodiment.

Operation of the decryption device 80 according to the first embodiment will be described with reference to FIG. 15.

The operation of the decryption device 80 according to the first embodiment corresponds to a decryption method according to the first embodiment. The operation of the decryption device 80 according to the first embodiment also corresponds to processes of a decryption program according to the first embodiment.

Step S71: Acquisition Process

The acquisition unit 811 acquires a ciphertext TC to be processed from the homomorphic operation device 60 via the communication interface 84. Specifically, the acquisition unit 811 transmits an identifier of the ciphertext TC to be processed to the homomorphic operation device 60, and acquires the ciphertext TC transmitted as a response. The acquisition unit 811 writes the acquired ciphertext TC in the memory 82.

Step S72: Decryption Process

The decryption unit 812 retrieves the ciphertext TC acquired in step S71 from the memory 82. The decryption unit 812 executes the Dec algorithm in the multi-key homomorphic encryption, taking as input the retrieved ciphertext TC, so as to decrypt the ciphertext TC to generate a plaintext M'. The decryption unit 812 writes the generated plaintext M' in the memory 82.

Step S73: Output Process

The output unit 813 retrieves the plaintext M' generated in step S72 from the memory 82. The output unit 813 outputs the retrieved plaintext M' via the communication interface 84.

Effects of First Embodiment

As described above, in the privacy-preserving information processing system 10 according to the first embodiment, the conversion key generation device 40 generates the conversion key $rk_{i \rightarrow j}$ by encrypting the decryption key $sk_i$ of the conversion source with the public key $pk_j$ of the conversion target. As a result, by using this conversion key $rk_{i \rightarrow j}$, a ciphertext which is encrypted with the public key $pk_i$ of the conversion source and then on which a homomorphic operation is performed can be converted into a ciphertext that can be decrypted with the decryption key $sk_j$.

In the technique described in Patent Literature 1, a homomorphic operation cannot be performed until a key to be a conversion target of proxy re-encryption is determined, so that data cannot be processed in advance. If a plurality of users wish to use data resulting from a homomorphic operation, the homomorphic operation has to be performed after keys used to encrypt data prior to the homomorphic operation are converted into keys of the respective data users by proxy re-encryption. Therefore, the homomorphic operation must be performed individually for each ciphertext encrypted with the key of each data user, and a result of the homomorphic operation cannot be reused.

In contrast to this, in the privacy-preserving information processing system 10 according to the first embodiment, by converting a ciphertext resulting from a homomorphic operation by the ciphertext conversion device 70, the key of the ciphertext resulting from the homomorphic operation can be converted while preserving the privacy of an encrypted plaintext and without changing the plaintext. As a result, even when a ciphertext resulting from a homomorphic operation needs to be converted for a plurality of keys, it is not necessary to re-execute the homomorphic operation. In addition, by storing a ciphertext resulting from a homomorphic operation, intermediate data in the operation can be securely reused.

It is conceivable that a computer for performing homomorphic operations and a computer for performing proxy re-encryption are provided separately, such that the storage of ciphertexts and operations on ciphertexts are processed by a computer with a large storage capacity and high computational power, such as a cloud, and the conversion of keys is processed by a computer with high security, for example.

In this case, in the technique described in Patent Literature 1, it is necessary to transmit all ciphertexts to be used for an operation to the computer for proxy re-encryption so as to have their respective keys converted, and then transmit all the ciphertexts after conversion to the cloud again. Therefore, a large number of ciphertexts are to be communicated.

In contrast to this, in the privacy-preserving information processing system 10 according to the first embodiment, it is possible to transmit only a ciphertext resulting from a homomorphic operation that needs to be decrypted to the ciphertext conversion device 70, so as to generate a converted ciphertext. Therefore, even when the homomorphic operation device 60 and the ciphertext conversion device 70 are provided in different computers, only a small number of ciphertexts are to be communicated.

Other Configurations

First Variation

In the first embodiment, the functional components are realized by software. As a first variation, however, the functional components may be realized by hardware. With regard to the first variation, differences from the first embodiment will be described.

Figure 16:
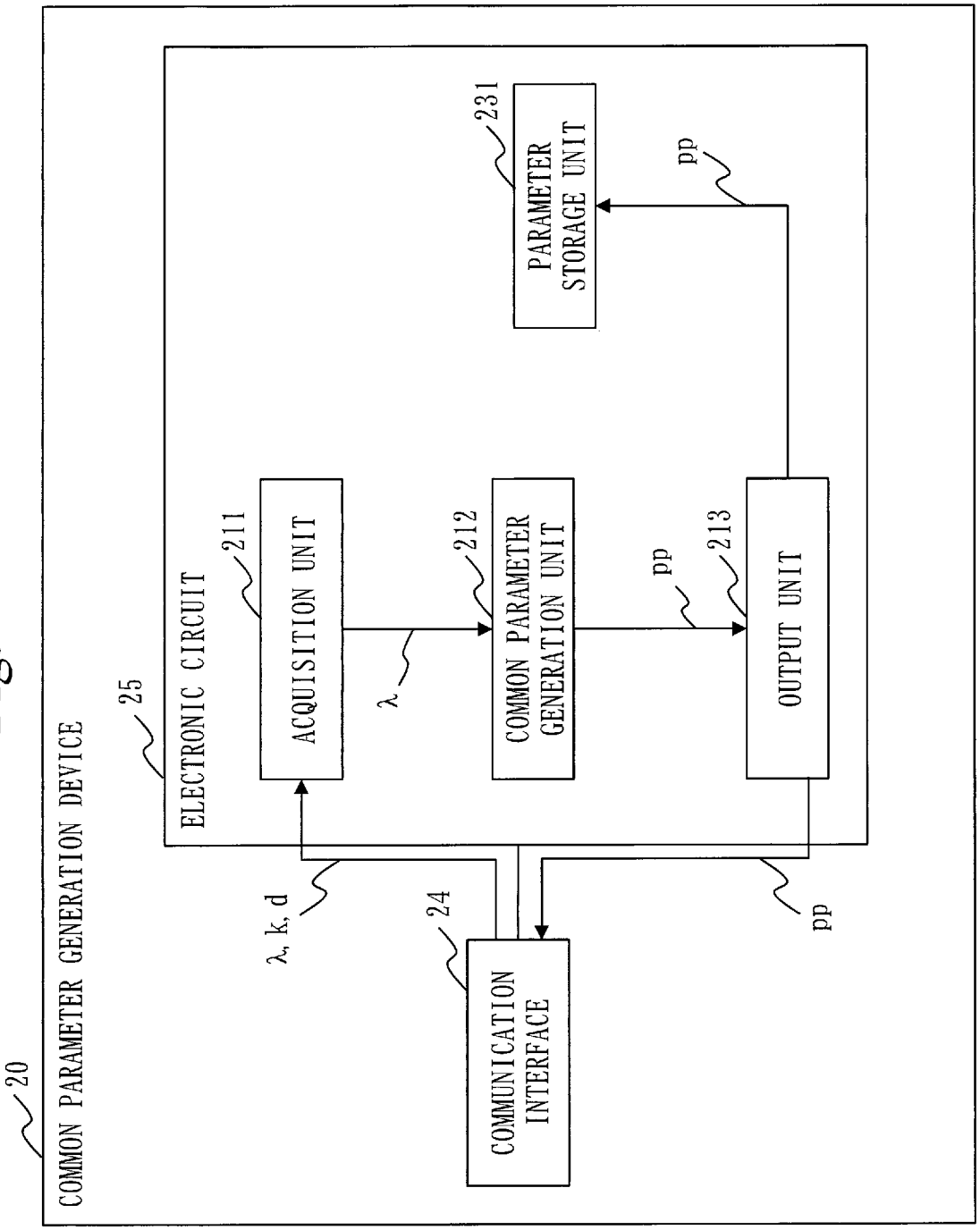
FIG. 16 is a configuration diagram of the common parameter generation device 20 according to a first variation.

A configuration of the common parameter generation device 20 according to the first variation will be described with reference to FIG. 16.

When the functions are realized by hardware, the common parameter generation device 20 includes an electronic circuit 25, in place of the processor 21, the memory 22, and the storage 23. The electronic circuit 25 is a dedicated circuit that realizes the functional components of the common parameter generation device 20 and the functions of the memory 22 and the storage 23.

Figure 17:
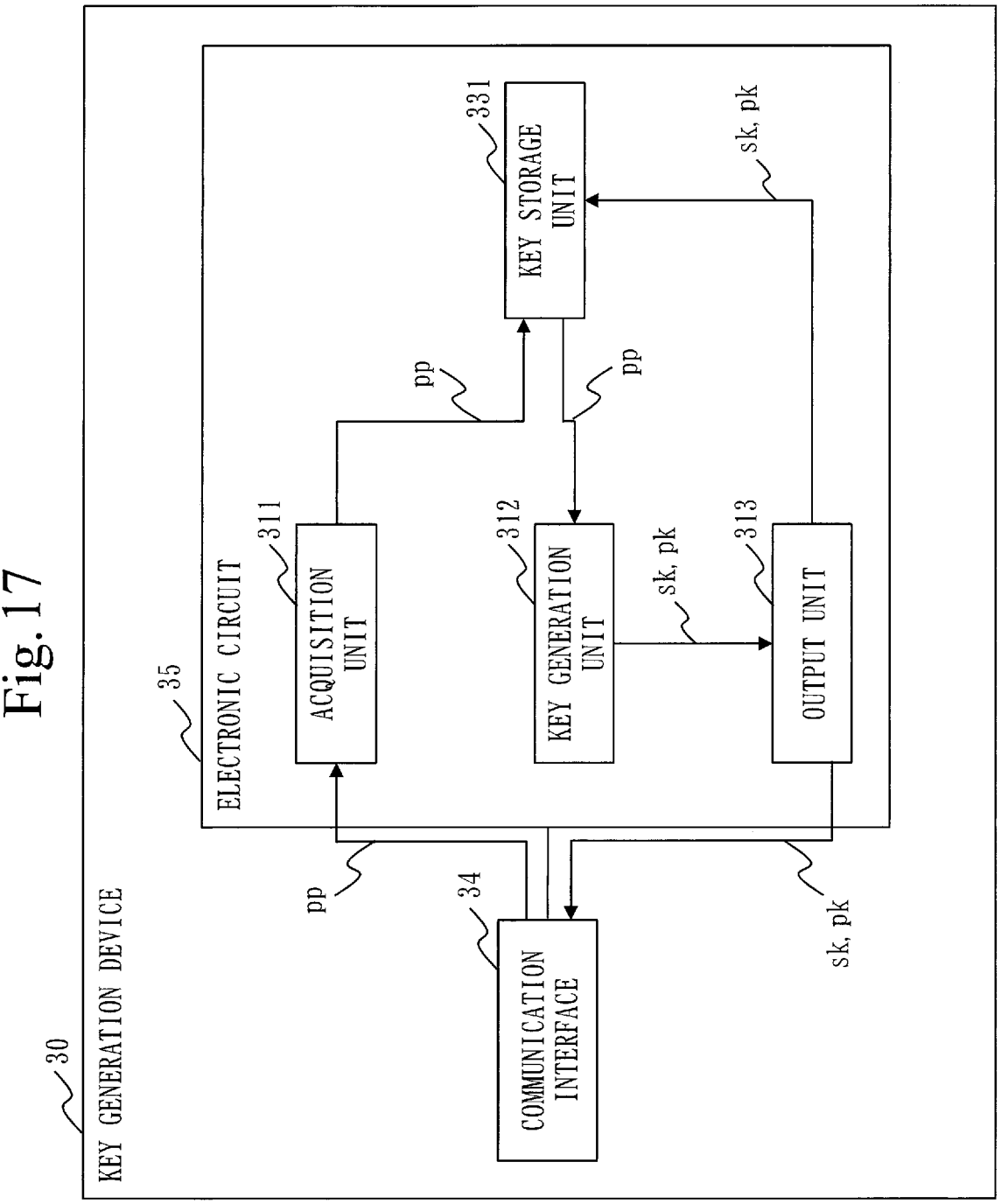
FIG. 17 is a configuration diagram of the key generation device 30 according to the first variation.

A configuration of the key generation device 30 according to the first variation will be described with reference to FIG. 17.

When the functions are realized by hardware, the key generation device 30 includes an electronic circuit 35, in place of the processor 31, the memory 32, and the storage 33. The electronic circuit 35 is a dedicated circuit that realizes the functional components of the key generation device 30 and the functions of the memory 32 and the storage 33.

Figure 18:
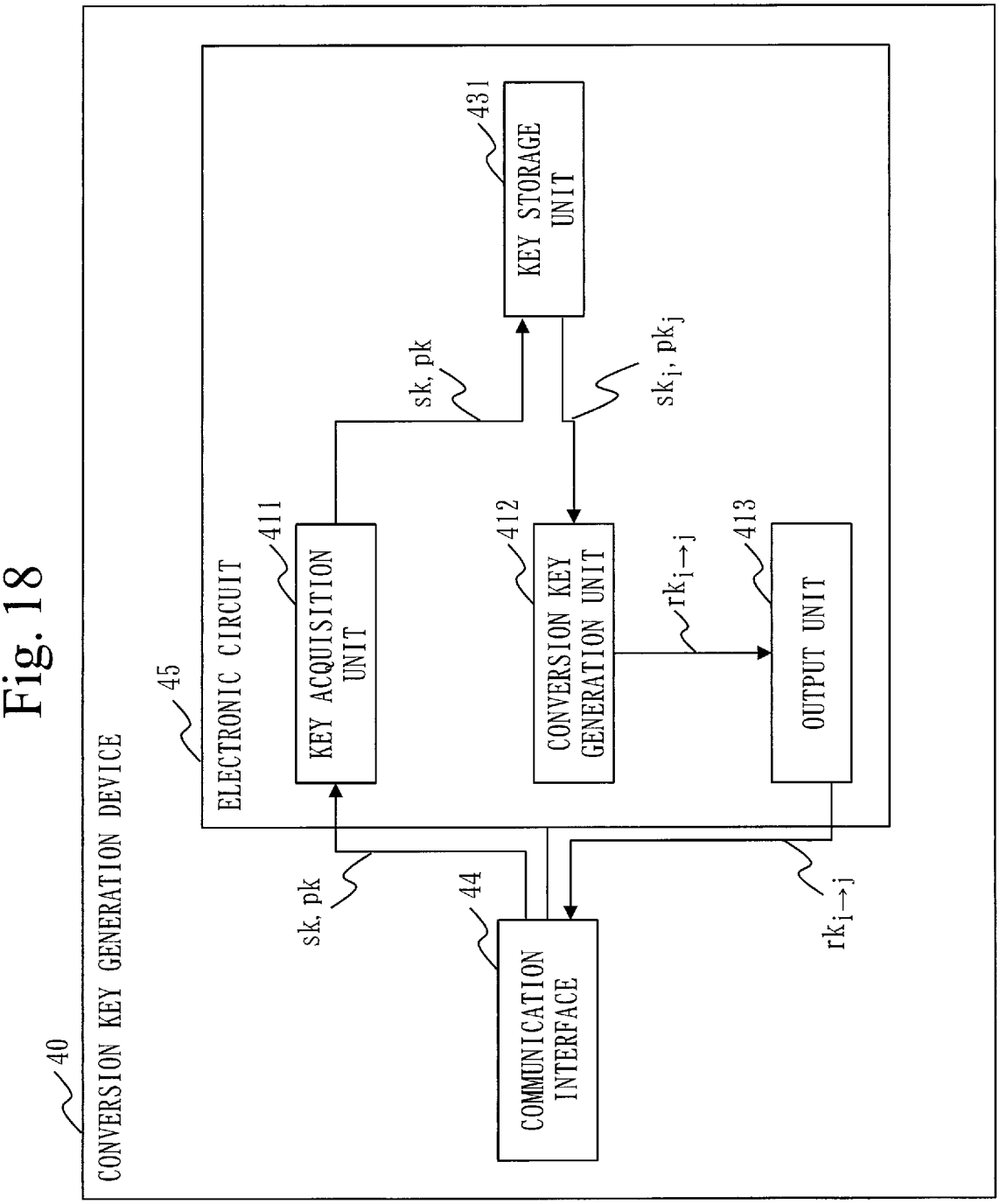
FIG. 18 is a configuration diagram of the conversion key generation device 40 according to the first variation.

A configuration of the conversion key generation device 40 according to the first variation will be described with reference to FIG. 18.

When the functions are realized by hardware, the conversion key generation device 40 includes an electronic circuit 45, in place of the processor 41, the memory 42, and the storage 43. The electronic circuit 45 is a dedicated circuit that realizes the functional components of the conversion key generation device 40 and the functions of the memory 42 and the storage 43.

Figure 19:
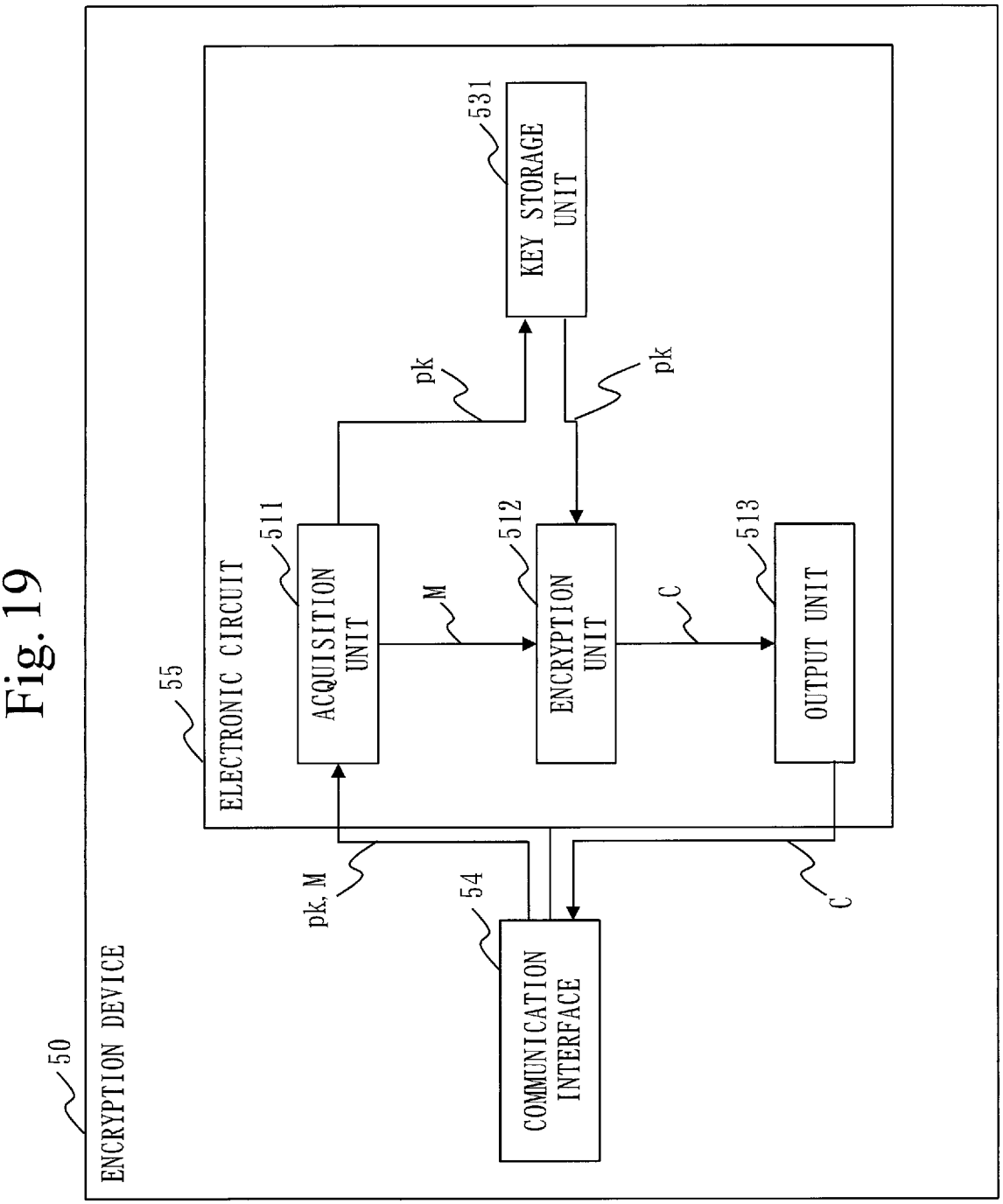
FIG. 19 is a configuration diagram of the encryption device 50 according to the first variation.

A configuration of the encryption device 50 according to the first variation will be described with reference to FIG. 19.

When the functions are realized by hardware, the encryption device 50 includes an electronic circuit 55, in place of the processor 51, the memory 52, and the storage 53. The electronic circuit 55 is a dedicated circuit that realizes the functional components of the encryption device 50 and the functions of the memory 52 and the storage 53.

Figure 20:
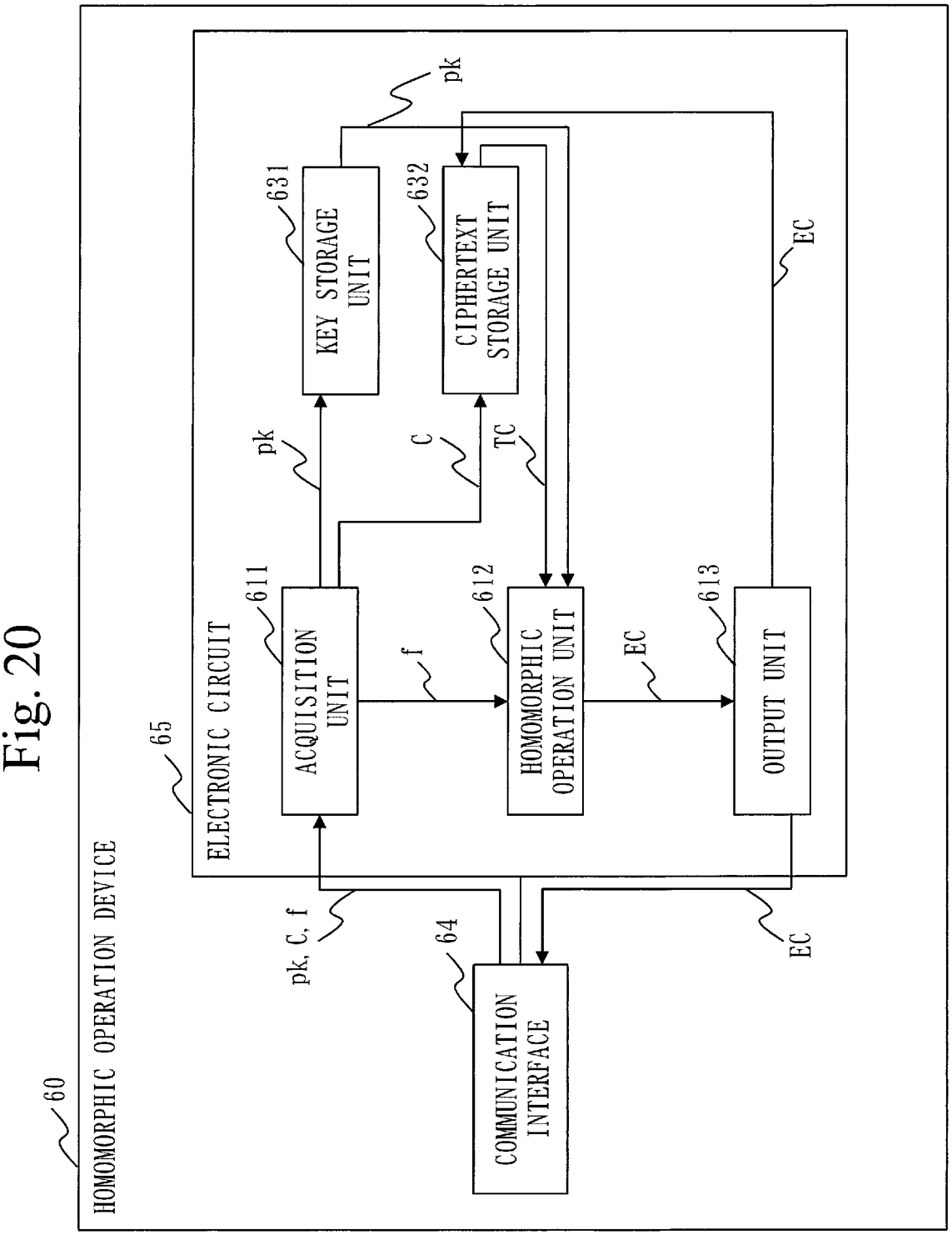
FIG. 20 is a configuration diagram of the homomorphic operation device 60 according to the first variation.

A configuration of the homomorphic operation device 60 according to the first variation will be described with reference to FIG. 20.

When the functions are realized by hardware, the homomorphic operation device 60 includes an electronic circuit 65, in place of the processor 61, the memory 62, and the storage 63. The electronic circuit 65 is a dedicated circuit that realizes the functional components of the homomorphic operation device 60 and the functions of the memory 62 and the storage 63.

Figure 21:
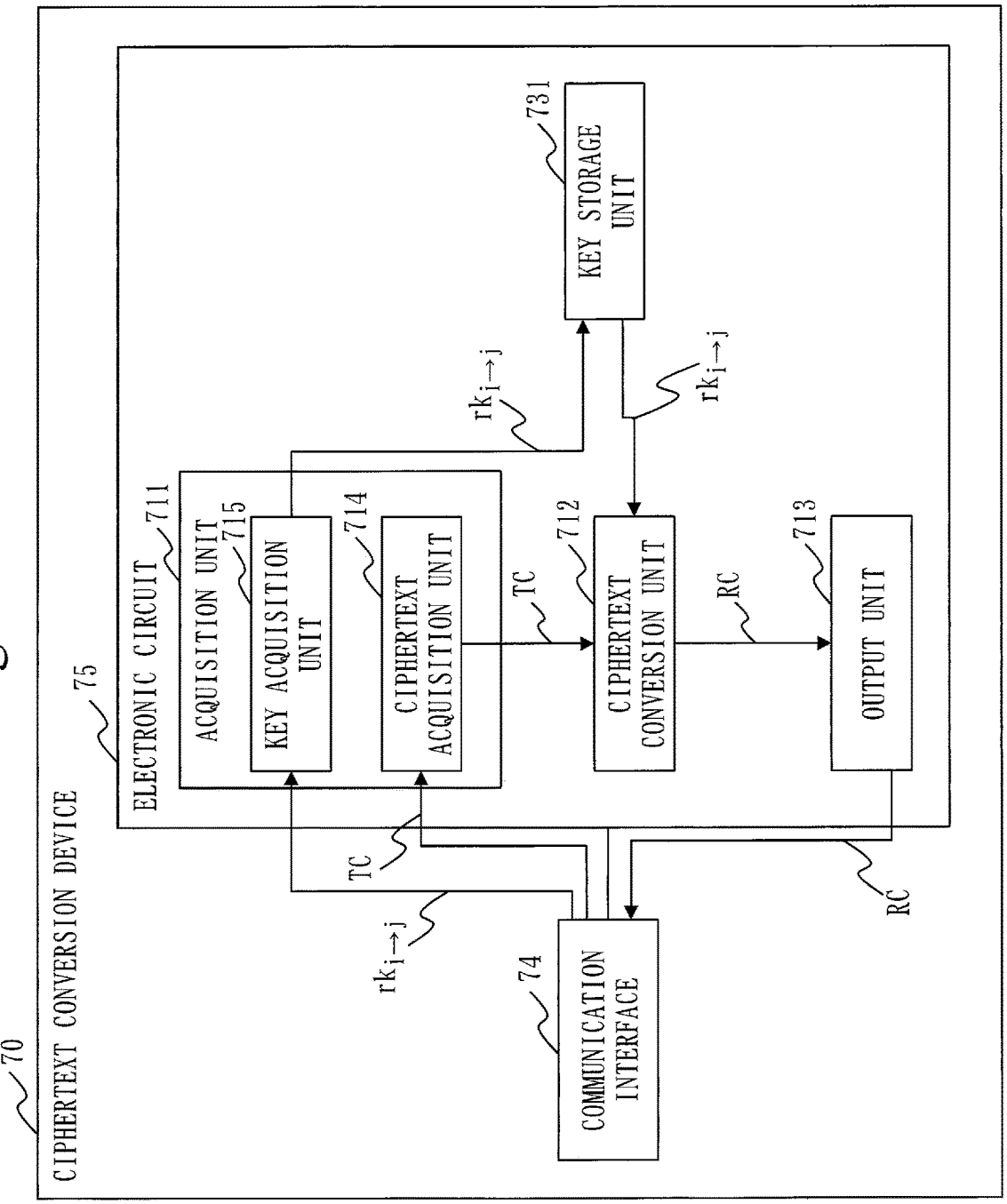
FIG. 21 is a configuration diagram of the ciphertext conversion device 70 according to the first variation.

A configuration of the ciphertext conversion device 70 according to the first variation will be described with reference to FIG. 21.

When the functions are realized by hardware, the ciphertext conversion device 70 includes an electronic circuit 75, in place of the processor 71, the memory 72, and the storage 73. The electronic circuit 75 is a dedicated circuit that realizes the functional components of the ciphertext conversion device 70 and the functions of the memory 72 and the storage 73.

Figure 22:
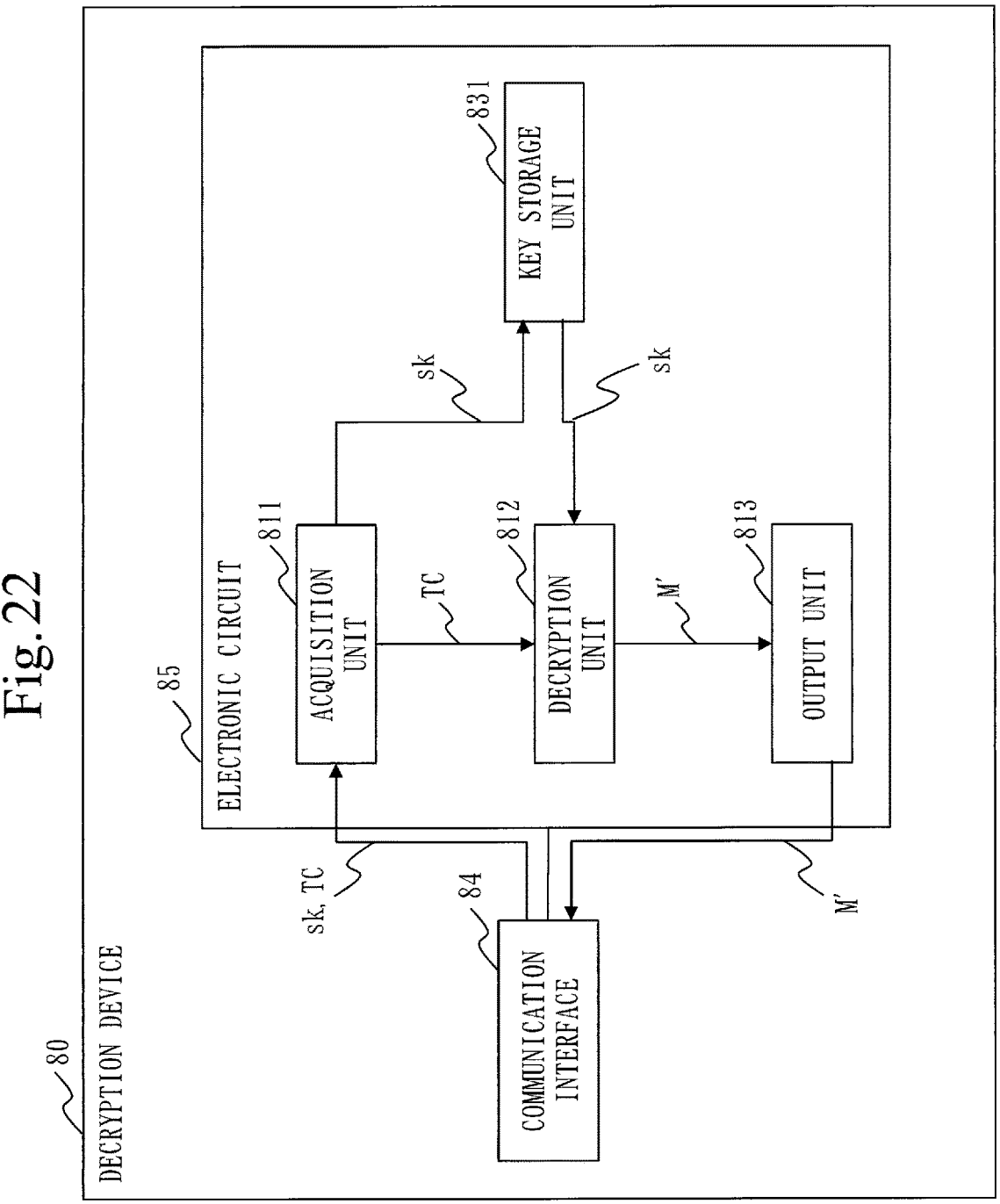
FIG. 22 is a configuration diagram of the decryption device 80 according to the first variation.

A configuration of the decryption device 80 according to the first variation will be described with reference to FIG. 22.

When the functions are realized by hardware, the decryption device 80 includes an electronic circuit 85, in place of the processor 81, the memory 82, and the storage 83. The electronic circuit 85 is a dedicated circuit that realizes the functional components of the decryption device 80 and the functions of the memory 82 and the storage 83.

Each of the electronic circuits 25, 35, 45, 55, 65, 75, and 85 is assumed to be a single circuit, a composite circuit, a programmed processor, a parallel-programmed processor, a logic IC, a gate array (GA), an application specific integrated circuit (ASIC), or a field-programmable gate array (FPGA).

The functions of the functional components of the common parameter generation device 20 may be realized by one electronic circuit 25, or the functions of the functional components may be distributed among and realized by a plurality of electronic circuits 25. Similarly, with regard to the key generation device 30, the conversion key generation device 40, the encryption device 50, the homomorphic operation device 60, the ciphertext conversion device 70, or the decryption device 80, the functions of the functional components may be realized by one electronic circuit 35, 45, 55, 65, 75, or 85, or the functions of the functional components may be distributed among and realized by a plurality of electronic circuits 35, 45, 55, 65, 75, or 85, respectively.

Second Variation

As a second variation, some of the functions may be realized by hardware, and the rest of the functions may be realized by software. That is, some of the functions of the functional components may be realized by hardware, and the rest of the functions may be realized by software.

Each of the processors 21, 31, 41, 51, 61, 71, and 81, the memories 22, 32, 42, 52, 62, 72, and 82, the storages 23, 33, 43, 53, 63, 73, and 83, and the electronic circuits 25, 35, 45, 55, 65, 75, and 85 is referred to as processing circuitry. That is, the functions of the functional components are realized by the processing circuitry.

SECOND EMBODIMENT

In a second embodiment, a specific scheme based on a multi-key homomorphic encryption scheme described in Non-Patent Literature 1 will be described. In the second embodiment, the scheme based on the large-ciphertext construction described in Non-Patent Literature 1 will be described. In the second embodiment, differences from the first embodiment will be described and description of the same portions will be omitted.

Notation and Definitions

When A is a distribution, $y \leftarrow A$ denotes that y is randomly selected from A according to the distribution of A. When A is a set, $y \leftarrow A$ denotes that y is uniformly selected from A. When A is an algorithm, $y \leftarrow A(x)$ denotes that an output y is generated for an input x.

Note that n, q, and $\chi$ are certain Learning With Errors (LWE) parameters, $m = O(n \log q)$, L is a minimum integer equal to or more than $\log q$, and $g := (1, 2, \ldots, 2^{L-1})$. For any $x \in Z_q$, $y := g^{-1}[x] \in \{0,1\}^L$ is a vector that satisfies $\langle y, g \rangle = x \in Z_q$. For any natural numbers n and m, $I_n$ is an n×n identity matrix, $0_{n \times m}$ is an n×m matrix in which all elements are 0, and $1_{n \times m}$ is an n×m matrix in which all elements are 1. For any $i \in [n]$, $e_i \in \{0,1\}^n$ is a canonical basis vector in which the n-th element is 1 and the rest of the elements are 0. Note that [a||b] denotes a concatenation of vectors or matrices a and b.

Description of Operation

Operation of the common parameter generation device 20 according to the second embodiment will be described with reference to FIG. 9.

The processes of step S11 and step S13 are the same as in the first embodiment.

Step S12: Common Parameter Generation Process

The common parameter generation unit 212 executes the Setup algorithm in the multi-key homomorphic encryption, so as to generate a common parameter pp, as indicated in Formula 11.

Setup($1^\lambda, 1^k, 1^d$):

$pp := A \leftarrow \mathbb{Z}_q^{n \times m}$. [Formula 11]

Operation of the key generation device 30 according to the second embodiment will be described with reference to FIG. 10.

The process of step S22 is the same as in the first embodiment.

Step S21: Key Generation Process

The key generation unit 312 executes the KG algorithm in the multi-key homomorphic encryption, so as to generate a pair of a decryption key sk and a public key pk, as indicated in Formula 12.

KG(pp):

$\bar{t} \leftarrow \chi^{n-1}, t := (-\bar{t}, 1) \in \mathbb{Z}^n, e \leftarrow \chi^m$, $b := tA + e$, sk:=t, pk:=(b,A). [Formula 12]

Operation of the conversion key generation device 40 according to the second embodiment will be described with reference to FIG. 11.

The processes of step S31 and step S33 are the same as in the first embodiment.

Step S32: Conversion Key Generation Process

The conversion key generation unit 412 executes the RKGen algorithm in the multi-key homomorphic encryption, taking as input the decryption key $sk_i$ and the public key $pk_j$, so as to encrypt the decryption key $sk_i$ with the public key $pk_j$ to generate a conversion key $rk_{i \to j}$, as indicated in Formula 13.

RKGen($sk_i, pk_j$): [Formula 13]

$B_j := A - e_n^t \otimes b_j$, $X_i \leftarrow \{0,1\}^{m \times nL}$, $rk_{i \to j} := B_j X_i + \begin{pmatrix} 0_{(n-1) \times nL} \\ t_i \cdot (I_n \otimes g) \end{pmatrix}$.

Operation of the encryption device 50 according to the second embodiment will be described with reference to FIG. 12.

The processes of step S41 and step S43 are the same as in the first embodiment.

Step S42: Encryption Process

It is assumed here that the plaintext M is to be encrypted with the public key $pk_i$ generated by the i-th key generation device 30.

The encryption unit 512 executes the Enc algorithm in the multi-key homomorphic encryption, taking as input the plaintext M and the public key $pk_i$, so as to encrypt the plaintext M with the public key $pk_i$ to generate a ciphertext C, as indicated in Formula 14.

Enc($pk_i, M \in \{0,1\}$):

index:=i, $B := A - e_n^t \otimes b$,

1. $X_C \leftarrow \{0,1\}^{m \times nL}, \overline{C} := BX_C, CT := \overline{C} + M(I_n \otimes g)$, 2. $R \leftarrow \{0,1\}^{m \times nL}, F := AR + M(I_n \otimes g)$, 3. $X_D \leftarrow \{0,1\}^{nmL \times nL}, \overline{D} := (1_{mL \times nL} \otimes B) \cdot X_D$, $D := \overline{D} + (R \otimes g^t \otimes e_n^t)$, $C := (CT, F, D, \text{index})$. [Formula 14]

Operation of the homomorphic operation device 60 according to the second embodiment will be described with reference to FIG. 13.

The processes of step S51 and step S53 are the same as in the first embodiment.

Step S52: Homomorphic Operation Process

With regard to each ciphertext TC input in step S51, the homomorphic operation unit 612 executes an Extend algorithm in the multi-key homomorphic encryption, taking as input the ciphertext TC concerned and the public key $pk_j$, so as to compute a ciphertext C', as indicated in Formula 15.

Extend($pk_i, C$):                                                                     [Formula 15]

$n' = ns$, $CT \in \mathbb{Z}_q^{n' \times n'L}$, $F \in \mathbb{Z}_q^{n \times nL}$, $D \in \mathbb{Z}_q^{n'mL \times nL}$, compute (i) or (ii), (i) index' = [index$\|i$]

1. $F' := F$,

2. $D' := \left(I_{mL} \otimes \begin{pmatrix} I_{n'} \\ 0_{n \times n'} \end{pmatrix}\right) \cdot D \in \mathbb{Z}_q^{(n'+n)mL \times nL}$ 3. $CT' := \begin{pmatrix} CT & X \\ & F \end{pmatrix} \in \mathbb{Z}_q^{(n'+n) \times (n'+n)L}$, $s := [-b_i](I_m \otimes g^{-1}) \in \{0, 1\}^{mL}$, $X := (s \otimes I_{n'}) \cdot D \in \mathbb{Z}_q^{n' \times nL}$.

(ii) index' = [$i\|$index]

1. $F' := F$,

2. $D' := \left(I_{mL} \otimes \begin{pmatrix} 0_{n \times n'} \\ I_{n'} \end{pmatrix}\right) \cdot D \in \mathbb{Z}_q^{(n'+n)mL \times nL}$ 3. $CT' := \begin{pmatrix} F & \\ X & CT \end{pmatrix} \in \mathbb{Z}_q^{(n'+n) \times (n'+n)L}$, $s := [-b_i](I_m \otimes g^{-1}) \in \{0, 1\}^{mL}$, $X := (s \otimes I_{n'}) \cdot D \in \mathbb{Z}_q^{n' \times nL}$.

$C' = (CT', F', D', \text{index}')$.

In Formula 15, s is the number of elements in index.

The homomorphic operation unit 612 executes the Eval algorithm in the multi-key homomorphic encryption, so as to generate a ciphertext EC resulting from performing the operation f on the ciphertext TC.

For example, the homomorphic operation unit 612 adds $C_1$ and $C_2$, which are two ciphertexts TC, as indicated in Formula 16.

Eval($C_1=(CT_1,F_1,D_1,\text{index}),C_2=(CT_2,F_2,D_2,\text{index})$):

($CT_{add},F_{add},D_{add},\text{index}_{add}$)

$:=(CT_1+CT_2,F_1+F_2,D_1+D_2,\text{index})$, $EC=(CT_{add},F_{add},D_{add},\text{index}_{add})$.                                    [Formula 16]

Alternatively, for example, the homomorphic operation unit 612 multiplies $C_1$ and $C_2$, which are two ciphertexts TC, as indicated in Formula 17.

Eval($C_1=(CT_1,F_1,D_1,\text{index}),C_2=(CT_2,F_2,D_2,\text{index})$):

$S_{ct} := (I_n \otimes g^{-1})[CT_2] \in \{0,1\}^{n'L \times n'L}$, $S_f := (I_n \otimes g^{-1})[F_2] \in \{0,1\}^{nL \times nL}$, $S_d := (I_{n'mL} \otimes g^{-1})[D_2] \in \{0,1\}^{n'mL^2 \times nL}$, $CT_{mul} := CT_1 \cdot S_{ct}$, $F_{mul} := F_1 \cdot S_f$, $D_{mul} := D_1 \cdot S_f + (I_{mL} \otimes CT_1) \cdot S_d$, $\text{index}_{mul} := \text{index}$, $EC = (CT_{mul}, F_{mul}, D_{mul}, \text{index}_{mul})$.                              [Formula 17]

Operation of the ciphertext conversion device 70 according to the second embodiment will be described with reference to FIG. 14.

The processes of step S61 and step S63 are the same as in the first embodiment.

Step S62: Ciphertext Conversion Process

It is assumed here that a ciphertext EC resulting from performing a homomorphic operation using as input a ciphertext encrypted with the public key plc.; for each integer i of i=1, . . . , s is to be converted into a ciphertext that can be decrypted with the decryption key $sk_j$ generated by the j-th key generation device 30. That is, index= [$1\|, \ldots, \|s$].

The ciphertext conversion unit 712 executes a ReEnc algorithm, taking as input the conversion key $rk_{i \to j}$ for each integer i of i=1, . . . , s and the ciphertext TC, which is the ciphertext EC resulting from performing a homomorphic operation, so as to generate a converted ciphertext RC, as indicated in Formula 18.

ReEnc($rk_{1 \to j}, \ldots, rk_{s \to j}, TC:=(CT,F,D,\text{index})$):

$CT^* := [rk_{1 \to j}\| \ldots \|rk_{s \to j}] \cdot (I_{ns} \otimes g^{-1})[CT]$, $F^* := F$, $D^* := (I_m \otimes [rk_{1 \to j}\| \ldots \|rk_{s \to j}]) \cdot (I_{ns} \otimes g^{-1})[D]$, $RC := (CT^*, F^*, D^*, j)$.                                                          [Formula 18]

Operation of the decryption device 80 according to the second embodiment will be described with reference to FIG. 15.

The processes of step S71 and step S73 are the same as in the first embodiment.

Step 872: Decryption Process

The decryption unit 812 executes the Dec algorithm in the multi-key homomorphic encryption, taking as input the ciphertext TC, so as to decrypt the ciphertext TC to generate a plaintext M', as indicated in Formula 19.

Dec($sk,TC := (CT,F,D,\text{index})$):

$M' := \text{``}t \cdot ct/2^{L-2}\text{''}$.                                          [Formula 19]

In Formula 19, ct is a column vector in the second column from the right in the element CT, and "$t \cdot ct/2^{L-2}$" signifies an integer closest to $t \cdot ct/2^{L-2}$. That is, the integer closest to $t \cdot ct/2^{L-2}$ is the plaintext M'.

Effects of Second Embodiment

The privacy-preserving information processing system 10 according to the second embodiment can realize a scheme by which a ciphertext on which a homomorphic operation has been performed can be converted into a ciphertext that can be decrypted with the decryption key $sk_i$ by employing a specific multi-key homomorphic encryption scheme.

In the first embodiment, the ciphertext conversion device 70 converts a ciphertext by the homomorphic operation algorithm. In contrast to this, in the second embodiment, the ciphertext conversion device 70 converts a ciphertext without using the homomorphic operation algorithm, so that the amount of computation can be reduced.

THIRD EMBODIMENT

In a third embodiment, a specific scheme based on a multi-key homomorphic encryption scheme described in Non-Patent Literature 1 will be described, as in the second embodiment. In the third embodiment, the scheme based on the small-ciphertext construction described in Non-Patent Literature 1 will be described. In the third embodiment, differences from the second embodiment will be described, and description of the same portions will be omitted.

Description of Operation

Operation of the key generation device 30 according to the third embodiment will be described with reference to FIG. 10.

The process of step S22 is the same as in the second embodiment.

Step S21: Key Generation Process

The key generation unit 312 executes the KG algorithm in the multi-key homomorphic encryption, so as to generate a pair of a decryption key sk and a public key pk, as indicated in Formula 20.

$KG(pp)$:

1. $\bar{t} \leftarrow \chi^{n-1}$, $t := (-\bar{t}, 1) \in \mathbb{Z}^n$, $e \leftarrow \chi^m$, $b := tA + e$, 2. $R \leftarrow \{0,1\}^{m \times n^2 L}$, $P := AR + (I_n \otimes t \otimes g) \in \mathbb{Z}_q^{n \times n^2 L}$, 3. choose $LWE$ matrix $\overline{D} \in \mathbb{Z}^{nmL \times n^2 L}$ such as $(I_{mL} \otimes t) \cdot \overline{D} \approx 0$, $D := \overline{D} + (R \otimes g^t \otimes e_n^t)$, $sk := t$, $pk := (b, P, D, A)$. [Formula 20]

Operation of the conversion key generation device 40 according to the third embodiment will be described with reference to FIG. 11.

The processes of step S31 and step S33 are the same as in the second embodiment.

Step S32: Conversion Key Generation Process

The conversion key generation unit 412 executes the RKGen algorithm in the multi-key homomorphic encryption, taking as input the decryption key $sk_i$ and the public key $pk_j$, so as to encrypt the decryption key $sk_i$ with the public key $pk_j$ to generate a conversion key $rk_{i \to j}$, as indicated in Formula 21.

$RKGen(sk_i, pk_j)$: [Formula 21]

$B_j := A - e_n^t \otimes b_j$, $X_i \leftarrow \{0,1\}^{m \times nL}$, $rk_{i \to j} := B_j X_i + \begin{pmatrix} 0_{(n-1) \times nL} \\ t_i \cdot (I_n \otimes g) \end{pmatrix}$.

Operation of the encryption device 50 according to the third embodiment will be described with reference to FIG. 12.

The processes of step S41 and step S43 are the same as in the second embodiment.

Step S42: Encryption Process

It is assumed here that the plaintext M is to be encrypted with the public key $pk_i$ generated by the i-th key generation device 30.

The encryption unit 512 executes the Enc algorithm in the multi-key homomorphic encryption, taking as input the plaintext M and the public key $pk_i$, so as to encrypt the plaintext M with the public key $pk_i$ to generate a ciphertext C, as indicated in Formula 22.

$Enc(pk_i, M \in \{0,1\})$:

index := $i$, $B := A - e_n^t \otimes b$, $X_C \leftarrow \{0,1\}^{m \times nL}$, $\overline{C} := BX_C \in \mathbb{Z}_q^{n \times nL}$, $CT := \overline{C} + M(I_n \otimes g) \in \mathbb{Z}_q^{n \times nL}$, $C := (CT, \text{index})$. [Formula 22]

Operation of the homomorphic operation device 60 according to the third embodiment will be described with reference to FIG. 13.

The processes of step S51 and step S53 are the same as in the second embodiment.

Step S52: Homomorphic Operation Process

With regard to each ciphertext TC input in step S51, the homomorphic operation unit 612 executes the Extend algorithm in the multi-key homomorphic encryption, taking as input the ciphertext TC concerned and the public key $pk_i$, so as to compute a ciphertext C', as indicated in Formula 23.

$\text{Extend}(pk_i, C)$: [Formula 23]

$n' = ns$, $CT \in \mathbb{Z}^{n' \times n'L}$, compute (i) or (ii), (i) $\text{index}' = [\text{index} \| i]$ 1. $Y' := \begin{pmatrix} Y \\ Y^* \end{pmatrix}$, $Y := I_k \otimes P^*$, $b := [b_1 \| \ldots \| b_s]$, $s := -[b](I_k \otimes I_m \otimes g^{-t}) \in \{0,1\}^{kmL}$, $Y^* := (s \otimes I_n) \cdot (I_k \otimes D^*)$, 2. $\overline{C} := C \cdot (e_n^t \otimes I_L)$, $S := (I_{nk} \otimes I_n \otimes g^{-1}) \cdot (\overline{C} \otimes I_n) \in \{0,1\}^{n^2 kL \times nL}$ Let $\Pi$ be the permutation matrix for which $(g \otimes t^*)\Pi = (t^* \otimes g)$ for any $t^*$ $X' := Y' \cdot S \cdot \Pi$,

3. $CT' := (CT \ X')$.

(ii) $\text{index}' = [i \| \text{index}]$

1. $Y' := \begin{pmatrix} Y^* \\ Y \end{pmatrix}$, $Y := I_k \otimes P^*$, $b := [b_1 \| \ldots \| b_s]$, $s := -[b](I_k \otimes I_m \otimes g^{-t}) \in \{0,1\}^{kmL}$, -continued $$Y^* := (s \otimes I_n) \cdot (I_k \otimes D^*),$$

2. $\overline{C} := C \cdot (e_n^t \otimes I_L),$ $$S := (I_{nk} \otimes I_n \otimes g^{-1}) \cdot (\overline{C} \otimes I_n) \in \{0,1\}^{n^2 kL \times nL}$$

Let $\Pi$ be the permutation matrix for which $(g \otimes t^*)\Pi = (t^* \otimes g)$ for any $t^*$ $$X' := Y' \cdot S \cdot \Pi,$$

3. $CT' := (X' \quad CT).$ $C' = (CT', \text{index}').$

In Formula 23, s is the number of elements in index.

The homomorphic operation unit 612 executes the Eval algorithm in the multi-key homomorphic encryption, so as to generate a ciphertext EC resulting from performing the operation f on the ciphertext TC.

For example, the homomorphic operation unit 612 adds $C_1$ and $C_2$, which are two ciphertexts TC, as indicated in Formula 24.

Eval($C_1$=($CT_1$,index),$C_2$=($CT_2$,index)):

($CT_{add}$,index$_{add}$)

:=($CT_1$+$CT_2$,index),

EC=($CT_{add}$,index$_{add}$). [Formula 24]

Alternatively, for example, the homomorphic operation unit 612 multiplies $C_1$ and $C_2$, which are two ciphertexts TC, as indicated in Formula 25.

Eval($C_1$=($CT_1$,index),$C_2$=($CT_2$,index)):

$S_{ct}:=(I_n \otimes g^{-1})[CT_2]\in\{0,1\}^{n'L\times n'L},$ $CT_{mul}:=CT_1 \cdot S_{ct},$ index$_{mul}$:=index, EC=($CT_{mul}$,index$_{mul}$). [Formula 25]

Operation of the ciphertext conversion device 70 according to the third embodiment will be described with reference to FIG. 14.

The processes of step S61 and step S63 are the same as in the second embodiment.

Step S62: Ciphertext Conversion Process

It is assumed here that a ciphertext EC resulting from performing a homomorphic operation using as input a ciphertext encrypted with the public key $pk_i$ for each integer i of i=1, . . . , s is to be converted into a ciphertext that can be decrypted with the decryption key $sk_j$ generated by the j-th key generation device 30.

The ciphertext conversion unit 712 executes the ReEnc algorithm, taking as input the conversion key $rk_{i \to j}$ for each integer i of i=1, . . . , s and the ciphertext TC, which is the ciphertext EC resulting from performing a homomorphic operation, so as to generate a converted ciphertext RC, as indicated in Formula 26.

ReEnc($rk_{1 \to j}, \ldots, rk_{s \to j}, TC: =(CT, \text{index})$):

$CT^* := [rk_{1 \to j} \| \ldots \| rk_{s \to j}] \cdot (I_{ns} \otimes g^{-1})[CT],$ RC:=($CT^*$,j). [Formula 26]

Operation of the decryption device 80 according to the third embodiment will be described with reference to FIG. 15.

The processes of step S71 and step S73 are the same as in the second embodiment.

Step S72: Decryption Process

The decryption unit 812 executes the Dec algorithm in the multi-key homomorphic encryption, taking as input the ciphertext TC, so as to decrypt the ciphertext TC to generate a plaintext M', as indicated in Formula 27.

Dec(sk,TC: =(CT,index)):

$M':=$ "$t \cdot ct/2^{L-2}$". [Formula 27]

In Formula 27, ct is a column vector in the second column from the right in the element CT, and "$t \cdot ct/2^{L-2}$" signifies an integer closest to $t \cdot ct/2^{L-2}$. That is, the integer closest to $t \cdot ct/2^{L-2}$ is the plaintext M'.

* Effects of Third Embodiment *

As described above, the privacy-preserving information processing system 10 according to the third embodiment can realizes a scheme by which a ciphertext on which a homomorphic operation has been performed can be converted into a ciphertext that can be decrypted with the decryption key $sk_j$ by employing a specific multi-key homomorphic encryption scheme, In the scheme realized by the privacy-preserving information processing system 10 according to the third embodiment, the number of elements in the public key pk is greater but the number of elements in the ciphertext C is smaller than those in the scheme realized by the privacy-preserving information processing system 10 according to the second embodiment.

REFERENCE SIGNS LIST

10: privacy-preserving information processing system, 20: common parameter generation device, 21: processor, 22: memory, 23: storage, 24: communication interface, 25: electronic circuit, 211: acquisition unit, 212: common parameter generation unit, 213: output unit, 231: parameter storage unit, 30: key generation device, 31: processor, 32: memory, 33: storage, 34: communication interface, 35: electronic circuit, 311: acquisition unit, 312: key generation unit, 313: output unit, 331: key storage unit, 40: conversion key generation device, 41: processor, 42: memory, 43: storage, 44: communication interface, 45: electronic circuit, 411: key acquisition unit, 412: conversion key generation unit, 413: output unit, 431: key storage unit, 50: encryption device, 51: processor, 52: memory, 53: storage, 54: communication interface, 55: electronic circuit, 511: acquisition unit, 512: encryption unit, 513: output unit, 531: key storage unit, 60: homomorphic operation device, 61: processor, 62: memory, 63: storage, 64: communication interface, 65: electronic circuit, 611: acquisition unit, 612: homomorphic operation unit, 613: output unit, 631: key storage unit, 632: ciphertext storage unit, 70: ciphertext conversion device, 71: processor, 72: memory, 73: storage, 74: communication interface, 75: electronic circuit, 711: acquisition unit, 712: ciphertext conversion unit, 713: output unit, 731: key storage unit, 80: decryption device, 81: processor, 82: memory, 83: storage, 84: communication interface, 85:

electronic circuit, 811: acquisition unit, 812: decryption unit, 813: output unit, 831: key storage unit, 90: transmission channels

The invention claimed is:

1. A conversion key generation device for use in a multi-key homomorphic encryption system comprising:
   processing circuitry to:
   receive and store a plurality of key pairs, each pair comprising a respective decryption key $sk_i$ and a public key $pk_i$ from each of a plurality of key generation devices, each of the plurality of key generation devices being associated on a one-to-one basis with a decryption device;
   acquire a source decryption key $sk_i$ in a pair of a conversion source from the plurality of stored pairs and a target public key $pk_j$ in a pair of a conversion target from the plurality of stored pairs, the conversion source pair and the conversion target pair being associated with different decryption devices; and
   encrypt the acquired source decryption key ski with the target public key $pk_j$, using an encryption algorithm in multi-key homomorphic encryption, so as to generate a conversion key $rk_{i \to j}$ for converting a ciphertext encrypted with a source public key $pk_i$ in the pair of the conversion source into a converted ciphertext RC decryptable with a target decryption key $sk_j$ in the pair of the conversion target.

2. The conversion key generation device according to claim 1, wherein the processing circuitry
   acquires a decryption key $sk_i$ including an element ti as indicated in Formula 101, and acquires a public key $pk_j$ including an element $b_j$ and an element A as indicated in Formula 102, and
   encrypts the decryption key ski with the public key $pk_j$, as indicated in Formula 103, so as to generate the conversion key $rk_{i \to j}$ $$\bar{t}_i \leftarrow \chi^{n-1}, t_i := (-ti, 1) \in Z^n \quad \text{[Formula 101]}$$

where n and $\chi$ are LWE parameters $$\bar{t}_j \leftarrow \chi^{n-1}, t_j := (-\bar{t}_j, 1) \in Z^n, e_j \leftarrow \chi^m, A \leftarrow Z_q^{n \times m}, b_j := t_j A + e_j \quad \text{[Formula 102]}$$

where
   q is an LWE parameter, and
   m is a natural number $$B_j := A - e_n^t \otimes b_j, X_i \leftarrow \{0, 1\}^{m \times nL},$$
$$rk_{i \to j} := B_j X_i + \begin{pmatrix} 0_{(n-1) \times nL} \\ t_i \cdot (I_n \otimes g) \end{pmatrix} \quad \text{[Formula 103]}$$

where
   $I_n$ is an n×n identity matrix, and $$g := (1, 2, \ldots, 2^{L-1}).$$

3. & ciphertext conversion device comprising:
   processing circuitry to:
   acquire a ciphertext C encrypted with a public key $pk_i$ in a pair of a conversion source, out of a plurality of pairs of a decryption key and a public key, the ciphertext C including an element CT and an element index as indicated in Formula 104;
   acquire a conversion key $rk_{i \to j}$, as indicated in Formula 105, resulting from encrypting a decryption key ski in the pair of the conversion source with a public key $pk_j$ in a pair of a conversion target out of the plurality of pairs; and
   convert, using the acquired conversion key $rk_{i \to j}$, the acquired ciphertext C into a converted ciphertext RC decryptable with a decryption key $sk_j$ in the pair of the conversion target, the converted ciphertext RC including an element CT* as indicated in Formula 106 and an element j $$\text{index} := i, A \to Z_q^{n \times m}, \bar{t}_i \to \chi^{n-1}, t_i := (-\bar{t}_i, 1) \in Z^n, b_i := t_i A + e_i,$$
$$B_i := A - e_n^t \otimes b_i, X_C \to \{0, 1\}^{m \times nL},$$
$$\bar{C} := B X_C \in Z_q^{n \times nL}, CT := \bar{C} + M(I_n \otimes g) \in Z_q^{n \times nL} \quad \text{[Formula 104]}$$

where
   n, q, and x are LWE parameters,
   m is a natural number,
   L is a minimum integer equal to or more than log q,
   $I_n$ is an n×n identity matrix, and $$g : (1, 2, \ldots, 2^{L-1})$$

$$\bar{t}_i \leftarrow \chi^{n-1}, t_i := (-\bar{t}_i, 1) \in Z^n, \quad \text{[Formula 105]}$$
$$\bar{t}_j \leftarrow \chi^{n-1}, t_j := (-\bar{t}_j, 1) \in Z^n, e_j \leftarrow \chi^m,$$
$$A \leftarrow Z_q^{n \times m}, b_j := t_j A + e_j,$$
$$B_j := A - e_n^t \otimes b_j, X_i \leftarrow \{0, 1\}^{m \times nL},$$
$$rk_{i \to j} := B_j X_i + \begin{pmatrix} 0_{(n-1) \times nL} \\ t_i \cdot (I_n \otimes g) \end{pmatrix}$$

$$CT^* := [rk_{i \to j}] \cdot (I_n \otimes g^{-1})[CT]. \quad \text{[Formula 106]}$$

4. The ciphertext conversion device according to claim 3, wherein the processing circuitry decrypts the ciphertext C with the decryption key ski included in the conversion key by a homomorphic operation, so as to convert the ciphertext C into the converted ciphertext RC.

5. A ciphertext conversion device comprising:
   processing circuitry to:
   acquire a ciphertext EC generated by performing a homomorphic operation on a ciphertext C encrypted with a public key $pk_i$ in a pair of a conversion source, out of a plurality of pairs of a decryption key and a public key, the ciphertext EC including an element CT, an element F, and an element D, the ciphertext $C_i$ including an element $CT_i$ and an element index, as indicated in Formula 107, for each integer i of i=1, ..., s, where s is an integer of 1 or more;
   acquire a conversion key $rk_{i \to j}$ for each integer i of i=1, ..., s, as indicated in Formula 108, resulting from encrypting a decryption key $sk_i$ in the pair of the conversion source with a public key $pk_j$ in a pair of a conversion target out of the plurality of pairs; and
   convert, using the conversion key $rk_{i \to j}$ for each integer i of i=1, ..., s, the acquired ciphertext EC into a converted ciphertext RC decryptable with a decryption key $sk_j$ in the pair of the conversion target, the converted ciphertext RC including an element CT* as indicated in Formula 109 and an element j $$\text{index} := i, A \to Z_q^{n \times m}, \bar{t}_i \to \chi^{n-1}, t_i := (-\bar{t}_i, 1) \in Z^n, b_i := t_i A + e_i,$$
$$B_i := A - e_n^t \otimes b_i, X_{Ci} \to \{0, 1\}^{m \times nL},$$
$$\bar{C}_i := B X_{Ci} \in Z_q^{n \times nL}, CT_i :=$$
$$\bar{C}_i + M_i(I_n \otimes g) \in Z_q^{n \times nL} \quad \text{[Formula 107]}$$

where
- n, q, and $\chi$ are LWE parameters,
- m is a natural number,
- L is a minimum integer equal to or more than log q,
- $I_n$ is an n×n identity matrix, and $$g:=(1,2,\ldots,2^{L-1})$$

$$\overline{t_i} \leftarrow \chi^{n-1}, t_i := (-\overline{t_i}, 1) \in \mathbb{Z}^n, \quad \text{[Formula 108]}$$
$$\overline{t_j} \leftarrow \chi^{n-1}, t_j := (-\overline{t_j}, 1) \in \mathbb{Z}^n, e_j \leftarrow \chi^m,$$
$$A \leftarrow \mathbb{Z}_q^{n \times m}, b_j := t_j A + e_j,$$
$$B_j := A - e_n^t \otimes b_j, X_i \leftarrow \{0,1\}^{m \times nL},$$
$$rk_{i \to j} := B_j X_i + \begin{pmatrix} 0_{(n-1) \times nL} \\ t_i \cdot (I_n \otimes g) \end{pmatrix}$$

$$CT^* := [rk_{1 \to j} \| \ldots \| rk_{s \to j}] \cdot (I_{ns} \otimes g^{-1})[CT]. \quad \text{[Formula 109]}$$

6. The ciphertext conversion device according to claim 5, wherein the processing circuitry decrypts the ciphertext EC with the decryption key $sk_i$ included in the conversion key $rk_{i \to j}$ by a homomorphic operation, so as to convert the ciphertext EC into the converted ciphertext RC.

7. A privacy-preserving information processing system comprising:
- a conversion key generation device configured to
  - receive and store a plurality of key pairs, each pair comprising a respective decryption key $sk_i$ and a public key $pk_i$ from each of a plurality of key generation devices, each of the plurality of key generation devices being associated on a one-to-one basis with a decryption device;
  - acquire a source decryption key $sk_i$ in a pair of a conversion source from the plurality of stored pairs and a target public key $pk_i$ in a pair of a conversion target from the plurality of stored pairs, the conversion source pair and the conversion target pair being associated with different decryption devices, and
  - encrypt a source decryption key $sk_i$ in a pair of a conversion source with the target public key $pk_j$ using an encryption algorithm in multi-key homomorphic encryption, so as to generate a conversion key $rk_{i \to j}$; and
- a ciphertext conversion device configured to convert, using the conversion key $rk_{i \to j}$ generated by the conversion key generation device, a ciphertext encrypted with a source public key $pk_i$ in the pair of the conversion source out of the plurality of pairs into a converted ciphertext RC decryptable with a target decryption key $sk_j$ in the pair of the conversion target.

8. A conversion key generation method comprising:
- receiving and storing a plurality of key pairs, each pair comprising a respective decryption key $sk_i$ and a public key $pk_i$ from each of a plurality of key generation devices, each of the plurality of key generation devices being associated on a one-to-one basis with a decryption device,
- acquiring a source decryption key ski in a pair of a conversion source from the plurality of stored pairs and a target public key $pk_i$ in a pair of a conversion target from the plurality of stored pairs, the conversion source pair and the conversion target pair being associated with different decryption devices; and
- encrypting the source decryption key $sk_i$ with the target public key $pk_j$ using an encryption algorithm in multi-key homomorphic encryption, so as to generate a conversion key $rk_{i \to j}$ for converting a ciphertext encrypted with a source public key $pk_i$ in the pair of the conversion source into a converted ciphertext RC decryptable with a target decryption key $sk_j$ in the pair of the conversion target.

9. A non-transitory computer readable medium storing a conversion key generation program for causing a computer to execute:
- a pair receiving and storing process to receive and stored a plurality of key pairs, each pair comprising a respective decryption key $sk_i$ and a public key $pk_i$ from each of a plurality of key generation devices, each of the plurality of key generation devices being associated on a one-to-one basis with a decryption device,
- a key acquisition process to acquire a source decryption key $sk_i$ in a pair of a conversion source from the plurality of stored pairs and a target public key $pk_i$ in a pair of a conversion target from the plurality of stored pairs, the conversion source pair and the conversion target pair being associated with different decryption devices; and
- a conversion key generation process to encrypt the source decryption key $sk_i$ acquired by the key acquisition process with the target public key $pk_j$, using an encryption algorithm in multi-key homomorphic encryption, so as to generate a conversion key $rk_{i \to j}$ for converting a ciphertext encrypted with a source public key $pk_i$ in the pair of the conversion source into a converted ciphertext RC decryptable with a target decryption key $sk_j$ in the pair of the conversion target.

10. A ciphertext conversion method comprising:
- acquiring a ciphertext C encrypted with a public key $pk_i$ in a pair of a conversion source, out of a plurality of pairs of a decryption key and a public key, the ciphertext C including an element CT and an element index as indicated in Formula 110;
- acquiring a conversion key $rk_{i \to j}$, as indicated in Formula 111, resulting from encrypting a decryption key $sk_i$ in the pair of the conversion source with a public key $pk_j$ in a pair of a conversion target out of the plurality of pairs; and
- converting, using the conversion key $rk_{i \to j}$, the ciphertext C into a converted ciphertext RC decryptable with a decryption key $sk_j$ in the pair of the conversion target, the converted ciphertext RC including an element CT* as indicated in Formula 112 and an element j $$\text{index} := i, A \to \mathbb{Z}_q^{n \times m}, \overline{t_i} \to \chi^{n-1}, t_i := (-\overline{t_i}, 1) \in \mathbb{Z}^n, b_i := t_i A + e_i,$$
$$B_i := A - e_n^t \otimes b_i, X_C \to \{0,1\}^{m \times nL},$$
$$\overline{C} := B X_C \in \mathbb{Z}_q^{n \times nL}, CT := \overline{C} + M(I_n \otimes g) \in \mathbb{Z}_q^{n \times nL} \quad \text{[Formula 110]}$$

where
- n, q and $\chi$ are LWE parameters,
- m is a natural number,
- L is a minimum integer equal to or more than log q,
- $I_n$ is an n×n identity matrix, and $$g:=(1,2,\ldots,2^{L-1})$$

$$\overline{t_i} \leftarrow \chi^{n-1}, t_i := (-\overline{t_i}, 1) \in \mathbb{Z}^n, \quad \text{[Formula 111]}$$
$$\overline{t_j} \leftarrow \chi^{n-1}, t_j := (-\overline{t_j}, 1) \in \mathbb{Z}^n, e_j \leftarrow \chi^m,$$
$$A \leftarrow \mathbb{Z}_q^{n \times m}, b_j := t_j A + e_j,$$
$$B_j := A - e_n^t \otimes b_j, X_i \leftarrow \{0,1\}^{m \times nL},$$
$$rk_{i \to j} := B_j X_i + \begin{pmatrix} 0_{(n-1) \times nL} \\ t_i \cdot (I_n \otimes g) \end{pmatrix}$$

$$CT^* := [rk_{i \to j}] \cdot (I_n \otimes g^{-1})[CT]. \quad \text{[Formula 112]}$$

11. A ciphertext conversion method comprising:
acquiring a ciphertext EC generated by performing a homomorphic operation on a ciphertext $C_i$ encrypted with a public key $pk_i$ in a pair of a conversion source, out of a plurality of pairs of a decryption key and a public key, the ciphertext EC including an element CT, an element F, and an element D, the ciphertext $C_i$ including an element $CT_i$ and an element index, as indicated in Formula 113, for each integer i of i=1, . . . , s, where s is an integer of 1 or more;
acquiring a conversion key $rk_{i \to j}$ for each integer i of i=1, . . . , s, as indicated in Formula 114, resulting from encrypting a decryption key sk in the pair of the conversion source with a public key $pk_j$ in a pair of a conversion target out of the plurality of pairs; and
converting, using the conversion key $rk_{i \to j}$ for each integer i of i=1, . . . , s, the ciphertext EC into a converted ciphertext RC decryptable with a decryption key $sk_j$ in the pair of the conversion target, the converted ciphertext RC including an element CT* as indicated in Formula 115 and an element j $$\text{index} := i, A \to Z_q^{n \times m}, \overline{t}_i \to \chi^{n-1}, t_i := (-\overline{t}_i, 1) \in \mathbb{Z}^n,\ b_i := t_i A + e_i,$$
$$B_i := A - e_n^t \otimes b_i, X_{Ci} \to \{0, 1\}^{m \times nL},$$
$$\overline{C}_i := B X_{Ci} \in Z_q^{n \times nL}, CT_i := \overline{C}_i + M_i(I_n \otimes g) \lfloor Z_q^{n \times nL} \quad \text{[Formula 113]}$$

where
n, q, and χ are LWE parameters,
m is a natural number,
L is a minimum integer equal to or more than log q,
In is an n×n identity matrix, and $$g := (1, 2, \ldots, 2^{L-1})$$

$$\overline{t}_i \leftarrow \chi^{n-1},\ t_i := (-\overline{t}_i, 1) \in \mathbb{Z}^n, \quad \text{[Formula 114]}$$
$$\overline{t}_j \leftarrow \chi^{n-1},\ t_j := (-\overline{t}_j, 1) \in \mathbb{Z}^n,\ e_j \leftarrow \chi^m,$$
$$A \leftarrow \mathbb{Z}_q^{n \times m},\ b_j := t_j A + e_j,$$
$$B_j := A - e_n^t \otimes b_j,\ X_i \leftarrow \{0, 1\}^{m \times nL},$$
$$rk_{i \to j} := B_j X_i + \begin{pmatrix} 0_{(n-1) \times nL} \\ t_i \cdot (I_n \otimes g) \end{pmatrix}$$

$$CT^* := [rk_{1 \to j} \| \ldots \| rk_{s \to j}] \cdot (I_{ns} \otimes g^{-1})[CT]. \quad \text{[Formula 115]}$$

12. A non-transitory computer readable medium storing a ciphertext conversion program for causing a computer to execute:
a ciphertext acquisition process to acquire a ciphertext, C encrypted with a public key $pk_i$ in a pair of a conversion source, out of a plurality of pairs of a decryption key and a public key, the ciphertext C including an element CT and an element index as indicated in Formula 116;
a key acquisition process to acquire a conversion key as indicated in Formula 117, resulting from encrypting a decryption key ski in the pair of the conversion source with a public key $pk_j$ in a pair of a conversion target out of the plurality of pairs; and
a ciphertext conversion process to convert, using the conversion key $rk_{i \to j}$ acquired by the key acquisition process, the ciphertext C acquired by the ciphertext acquisition process into a converted ciphertext RC decryptable with a decryption key $sk_j$ in the pair of the conversion target, the converted ciphertext RC including an element CT* as indicated in Formula 118 and an element j $$\text{index} := i, A \to Z_q^{n \times m}, \overline{t}_i \to \chi^{n-1}, t_i := (-\overline{t}_i, 1) \in \mathbb{Z}^n,\ b_i := t_i A + e_i,$$
$$B_i := A - e_n^t \otimes b_i, X_C \to \{0, 1\}^{m \times nL},$$
$$\overline{C} := B X_C \in Z_q^{n \times nL}, CT := \overline{C} + M(I_n \otimes g) \in Z_q^{n \times nL} \quad \text{[Formula 116]}$$

where
n, q, and χ are LWE parameters,
m is a natural number,
L is a minimum integer equal to or more than log q,
$I_n$ is an n x n identity matrix, and $$g := (1, 2, \ldots, 2^{L-1})$$

$$\overline{t}_i \leftarrow \chi^{n-1},\ t_i := (-\overline{t}_i, 1) \in \mathbb{Z}^n, \quad \text{[Formula 117]}$$
$$\overline{t}_j \leftarrow \chi^{n-1},\ t_j := (-\overline{t}_j, 1) \in \mathbb{Z}^n,\ e_j \leftarrow \chi^m,$$
$$A \leftarrow \mathbb{Z}_q^{n \times m},\ b_j := t_j A + e_j,$$
$$B_j := A - e_n^t \otimes b_j,\ X_i \leftarrow \{0, 1\}^{m \times nL},$$
$$rk_{i \to j} := B_j X_i + \begin{pmatrix} 0_{(n-1) \times nL} \\ t_i \cdot (I_n \otimes g) \end{pmatrix}$$

$$CT^* := [rk_{i \to j}] \cdot (I_n \otimes g^{-1} \cdot T). \quad \text{[Formula 118]}$$

13. A non-transitory computer readable medium storing a ciphertext conversion program for causing a computer to execute:
a ciphertext acquisition process to acquire a ciphertext EC generated by performing a homomorphic operation on a ciphertext $C_i$ encrypted with a public key $pk_i$ in a pair of a conversion source, out of a plurality of pairs of a decryption key and a public key, the ciphertext EC including an element CT, an element F, and an element D, the ciphertext $C_i$ including an element $CT_i$ and an element index, as indicated in Formula 119, for each integer i of i=1, . . . , s, where s is an integer of 1 or more;
a key acquisition process to acquire a conversion key $rk_{i \to j}$ for each integer i of i=1, . . . , s, as indicated in Formula 120, resulting from encrypting a decryption key $sk_i$ in the pair of the conversion source with a public key $pk_j$ in a pair of a conversion target out of the plurality of pairs; and
a ciphertext conversion process to convert, using the conversion key $rk_{i \to j}$ for each integer i of i=1, . . . , s acquired by the key acquisition process, the ciphertext EC acquired by the ciphertext acquisition process into a converted ciphertext RC decryptable with a decryption key $sk_j$ in the pair of the conversion target, the converted ciphertext RC including an element CT* as indicated in Formula 121 and an element j $$\text{index} := i, A \to Z_q^{n \times m}, \overline{t}_i \to \chi^{n-1}, t_i := (-\overline{t}_i, 1) \in \mathbb{Z}^n,\ b_i := t_i A + e_i,$$
$$B_i := A - e_n^t \otimes b_i, X_{Ci} \to \{0, 1\}^{m \times nL},$$
$$\overline{C}_i := B X_{Ci} \in Z_q^{n \times nL}, CT_i := \overline{C}_i + M_i(I_n \otimes g) \lfloor Z_q^{n \times nL} \quad \text{[Formula 119]}$$

where
n, q, and χ are LWE parameters,
m is a natural number,
L is a minimum integer equal to or more than log q,
$I_n$ is an n×n identity matrix, and $$g := (1, 2, \ldots, 2^{L-1})$$

$$\overline{t}_i \leftarrow \chi^{n-1},\ t_i := (-\overline{t}_i, 1) \in \mathbb{Z}^n, \quad \text{[Formula 120]}$$
$$\overline{t}_j \leftarrow \chi^{n-1},\ t_j := (-\overline{t}_j, 1) \in \mathbb{Z}^n,\ e_j \leftarrow \chi^m,$$
$$A \leftarrow \mathbb{Z}_q^{n \times m},\ b_j := t_j A + e_j,$$
$$B_j := A - e_n^t \otimes b_j,\ X_i \leftarrow \{0, 1\}^{m \times nL},$$
$$rk_{i \to j} := B_j X_i + \begin{pmatrix} 0_{(n-1) \times nL} \\ t_i \cdot (I_n \otimes g) \end{pmatrix}$$

$$CT^* := [rk_{i \to j} \| \ldots \| rk_{s \to j}] \cdot (I_{ns} \otimes g^{-1})[CT]. \quad \text{[Formula 121]}$$

* * * * *